(12) United States Patent
Rule et al.

(10) Patent No.: US 11,210,656 B2
(45) Date of Patent: Dec. 28, 2021

(54) DETERMINING SPECIFIC TERMS FOR CONTACTLESS CARD ACTIVATION

(71) Applicant: Capital One Services, LLC, McLean, VA (US)

(72) Inventors: Jeffrey Rule, Chevy Chase, MD (US); Marisa Thomas, Richmond, VA (US); Amy Apponyi, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/847,268

(22) Filed: Apr. 13, 2020

(65) Prior Publication Data

US 2021/0319427 A1    Oct. 14, 2021

(51) Int. Cl.
*G06K 5/00* (2006.01)
*G06Q 20/34* (2012.01)
*G06Q 20/38* (2012.01)

(52) U.S. Cl.
CPC ......... *G06Q 20/354* (2013.01); *G06Q 20/352* (2013.01); *G06Q 20/3829* (2013.01)

(58) Field of Classification Search
CPC .. G06Q 20/341; G06Q 20/3674; G06Q 20/40; G07F 7/1008; G07F 7/0886; G06K 19/07; G06K 7/10237
(Continued)

(56) References Cited

U.S. PATENT DOCUMENTS 4,683,553 A    7/1987 Mollier
4,827,113 A    5/1989 Rikuna
(Continued)

FOREIGN PATENT DOCUMENTS

CA    3010336 A1    7/2017
CN    101192295 A    6/2008
(Continued)

OTHER PUBLICATIONS

International Search Report and Written Opinion for International Patent Application No. PCT/US2021/026850 dated Jul. 20, 2021, 9 pages.
(Continued)

*Primary Examiner* — Daniel St Cyr
(74) *Attorney, Agent, or Firm* — Kacvinsky Daisak Bluni PLLC

(57) ABSTRACT

Systems, methods, articles of manufacture, and computer-readable media for determining specific terms to activate a contactless card. An application executing on a server may receive a request from a device specifying a uniform resource locator comprising encrypted data, the encrypted data based at least in part on a private key assigned to a contactless card. The application may decrypt the encrypted data and determine a type of the contactless card. The application may determine a plurality of terms associated with the type of the contactless card and transmit the terms to a web browser on the device. The application may receive, from the web browser, an indication specifying acceptance of the plurality of terms. The application may store, based on the decryption of the encrypted data and the received indication specifying acceptance of the terms, an indication in a database specifying the contactless card is activated for use.

20 Claims, 17 Drawing Sheets

(58) Field of Classification Search
USPC .............................. 235/380, 382, 487, 492
See application file for complete search history.

(56) References Cited

U.S. PATENT DOCUMENTS

| | | | |
|---|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,162,208 B2 * | 4/2012 | Eckert ............... G06Q 30/0268 235/380 |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |

(56) References Cited

U.S. PATENT DOCUMENTS

| | | | |
|---|---|---|---|
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B2 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Fang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,467,622 B1 | 11/2019 | Rule et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0124246 A1* | 7/2004 | Allen .................. G07F 7/1008 235/492 |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |

(56) References Cited

U.S. PATENT DOCUMENTS

| | | |
|---|---|---|
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0053560 A1* | 3/2011 | Jain ................ G06Q 20/355 455/411 |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |

(56) References Cited

U.S. PATENT DOCUMENTS

| | | |
|---|---|---|
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2020/0090168 A1 | 3/2020 | Mossier et al. |
| 2020/0106614 A1 | 4/2020 | Rule et al. |
| 2021/0004786 A1* | 1/2021 | Mossler ............ G06Q 20/3278 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 3049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved

(56) References Cited

OTHER PUBLICATIONS from Internet URL: https://www.authorize.net/our-features/account-updater/, 5 pages.

Author Unknown, "Visa® Account Updater for Merchants", [online] 2019 [retrieved on Mar. 25, 2019], Retrieved from Internet URL: https://USA.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018] Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019], Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019] Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug BIG SEVEN open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2019]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019], Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019], Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved an Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019], Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019], Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019], Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019], Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

(56) References Cited

OTHER PUBLICATIONS

Dhamdhere, P., "Key Benefits of a Unified Platform for Loyalty, Referral Marketing, and UGC" Annex Cloud [online] May 19, 2017 [retrieved on Jul. 3, 2019], Retrieved from Internet URL: https://www.annexcloude.com/blog/benefits-unified-platform/, 13 pages.

* cited by examiner

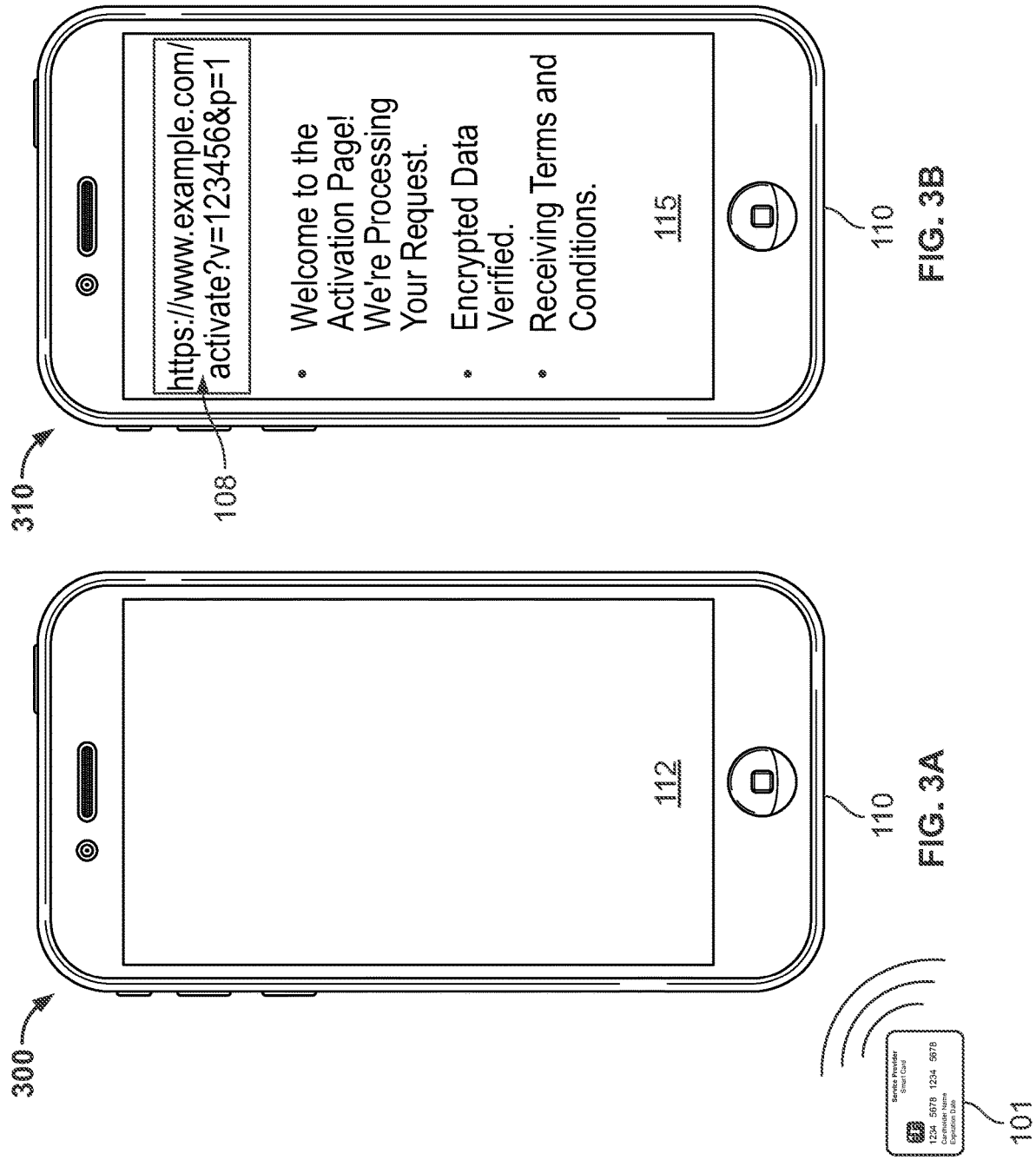

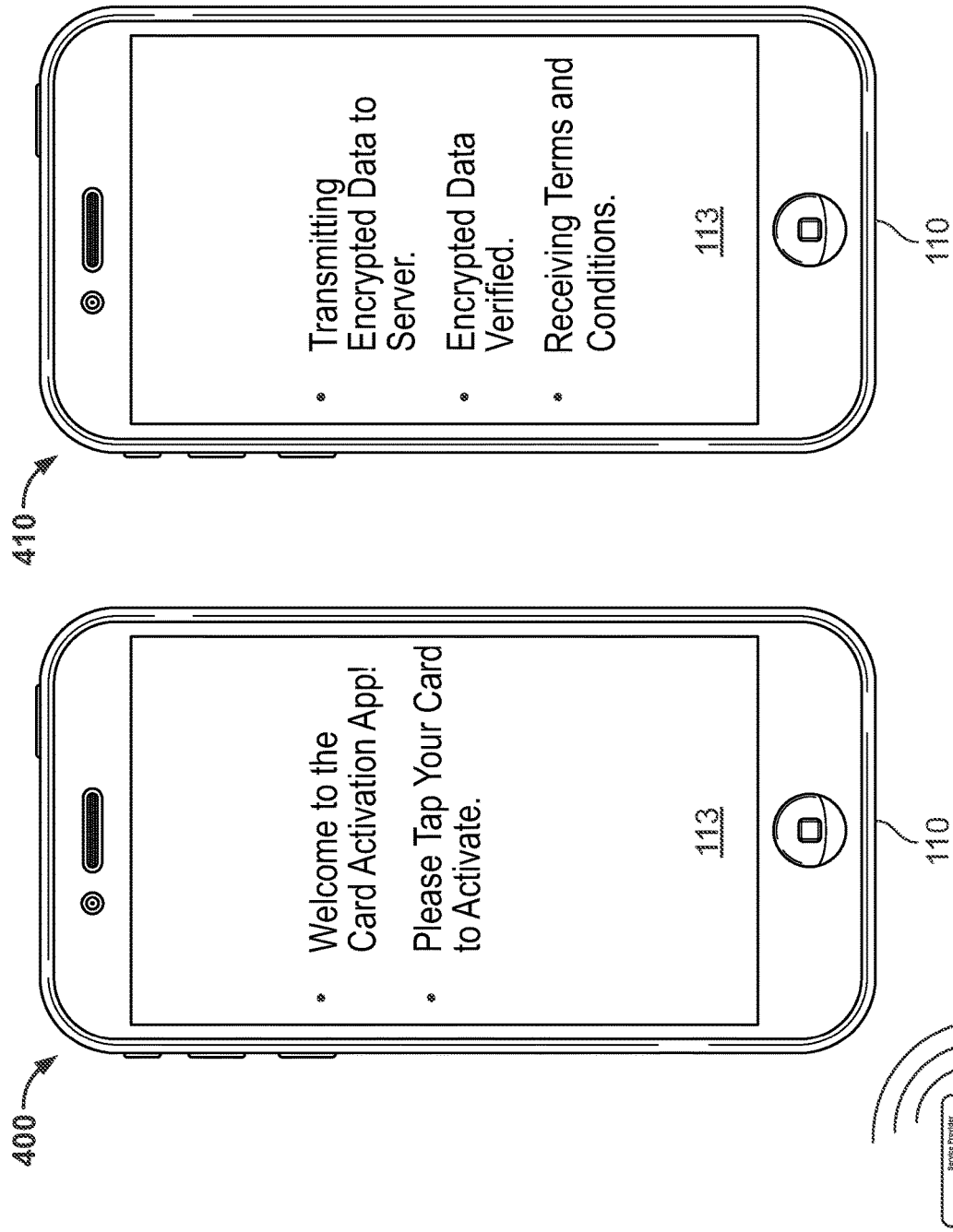

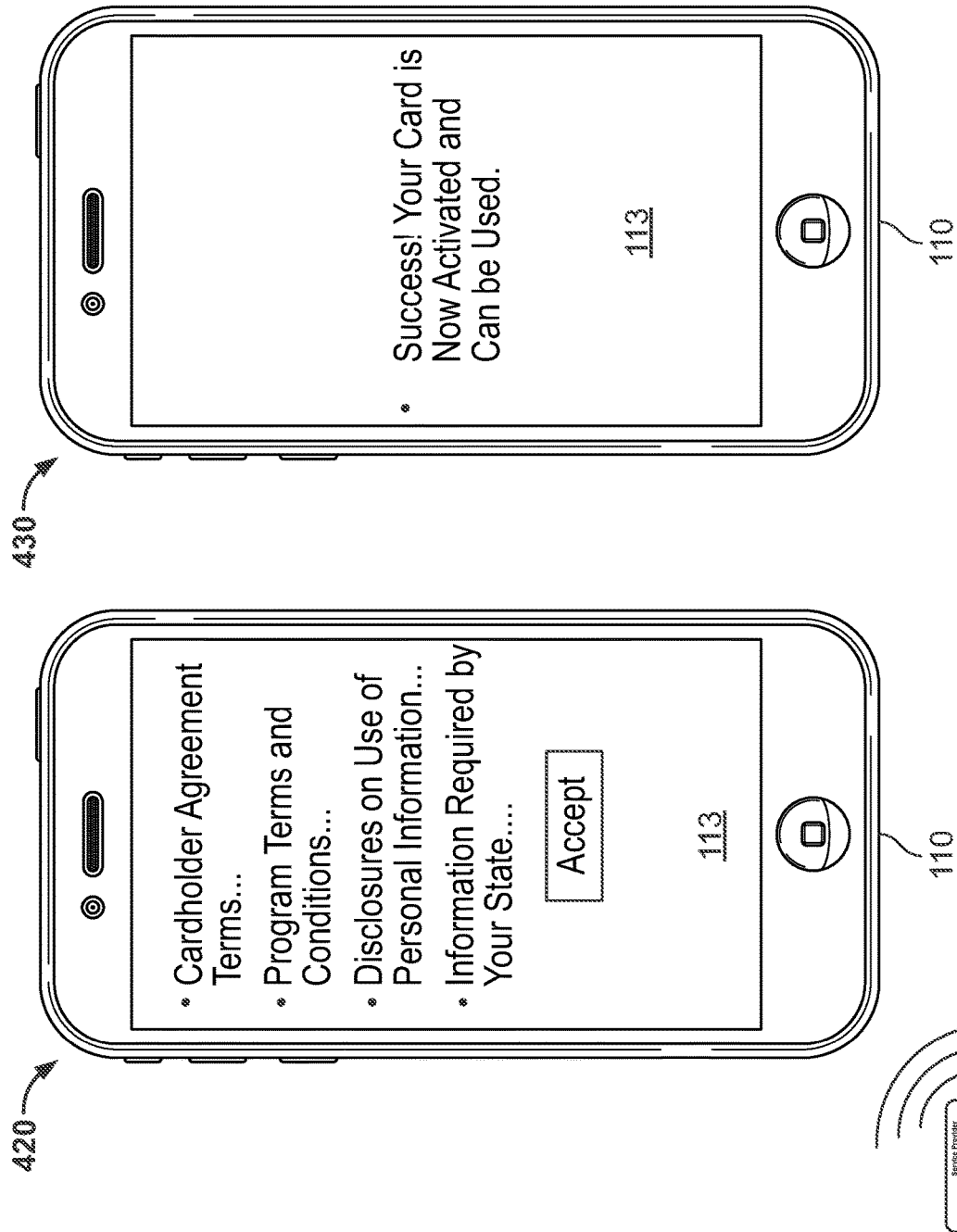

DETERMINING SPECIFIC TERMS FOR CONTACTLESS CARD ACTIVATION

TECHNICAL FIELD

Embodiments herein generally relate to computing platforms, and more specifically, to computing platforms to determine specific terms for contactless card activation.

BACKGROUND

Payment cards may be mailed to a customer in an inactive state such that the cards cannot be used for purchases or other transactions prior to activation. There are significant security risks involved in the card activation process. Furthermore, different requirements may be imposed on the activation of specific types of cards. While some solutions have attempted to move the activation process to online platforms, these solutions do not offer the flexibility and security required to scale to the ever increasing number of card types.

SUMMARY

Embodiments disclosed herein provide systems, methods, articles of manufacture, and computer-readable media for determining specific terms to activate a contactless card. In one example, an application executing on a server may receive a request from a device specifying a uniform resource locator comprising encrypted data, the encrypted data based at least in part on a private key assigned to a contactless card. The application may decrypt the encrypted data and determine a type of the contactless card. The application may determine a plurality of terms associated with the type of the contactless card and transmit the terms to a web browser on the device. The application may receive, from the web browser, an indication specifying acceptance of the plurality of terms. The application may store, based on the decryption of the encrypted data and the received indication specifying acceptance of the terms, an indication in a database specifying the contactless card is activated for use.

BRIEF DESCRIPTION OF THE DRAWINGS

FIGS. 3A-3D illustrate embodiments of determining specific terms for contactless card activation.

FIGS. 4A-4D illustrate embodiments of determining specific terms for contactless card activation.

DETAILED DESCRIPTION

Figure 1A:
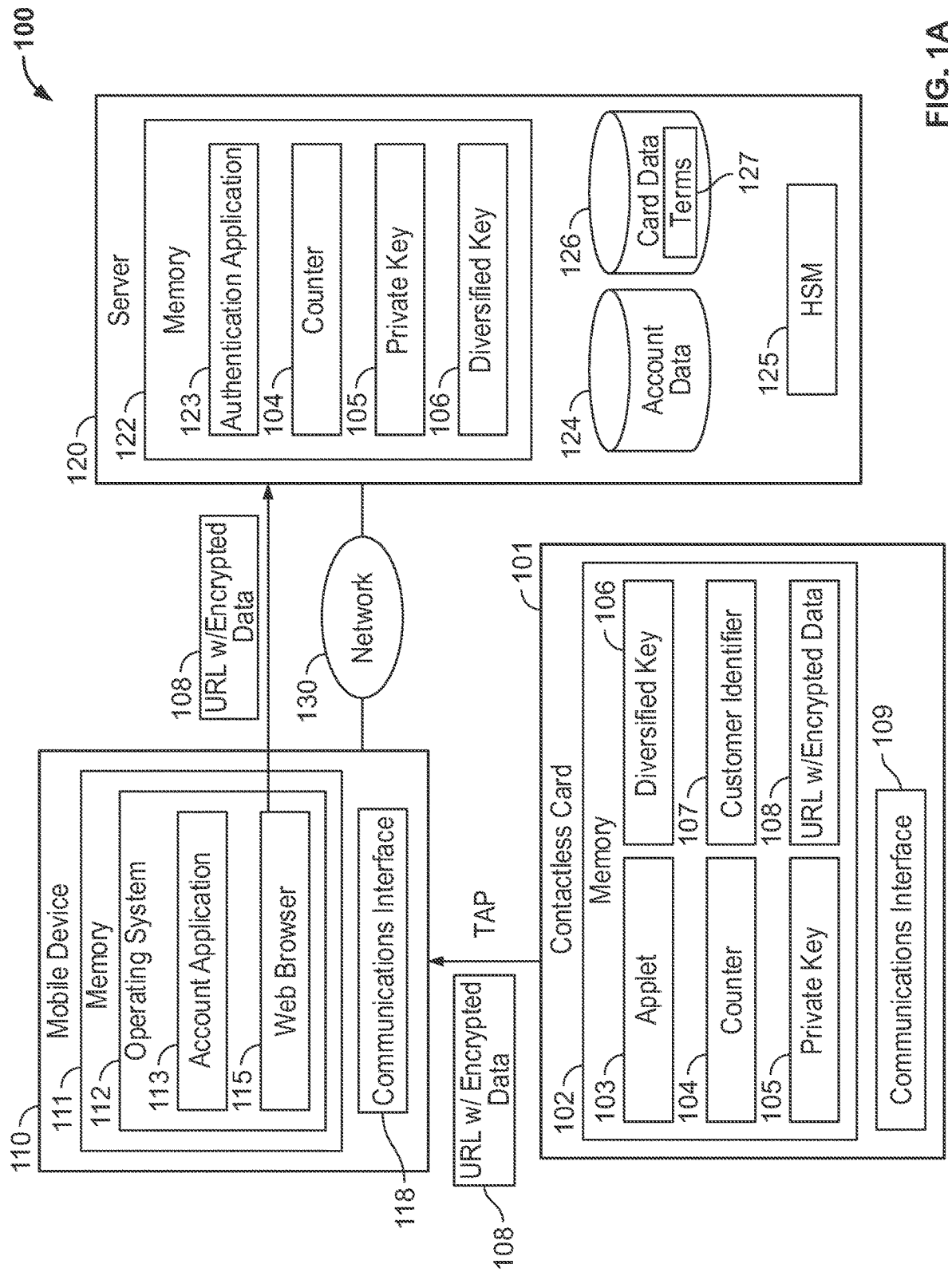
FIGS. 1A-1C illustrate embodiments of a system for determining specific terms for contactless card activation.

Embodiments disclosed herein provide techniques for secure activation of contactless cards with disclosure of card-specific terms and/or customer-specific terms. Generally, a user may receive a contactless card in an inactive state that must be activated to be used. In some embodiments, the user may tap the contactless card to a computing device, such as a smartphone, to initiate the activation process. Tapping the contactless card to the smartphone (or otherwise brining the contactless card within wireless data communications range of the smartphone) may cause the contactless card to generate encrypted data. The encrypted data may be transmitted to the smartphone.

In some embodiments, the encrypted data generated by the contactless card may be part of a uniform resource locator (URL) directed to a server. Once received, an operating system (OS) of the smartphone may cause a web browser to access the URL. When accessed, the server may receive the encrypted data, and decrypt the encrypted data to verify the authenticity of the contactless card. The server may then determine a type of the contactless card and determine a plurality of terms and conditions associated with the card. The terms and conditions may be transmitted to the web browser on the smartphone, where the user may then accept and/or decline the terms and conditions. If the user accepts, an indication of the acceptance is transmitted to the server, which may activate the contactless card, e.g., by storing an indication that the contactless card is active in a database. The user may then use the contactless card for any desired payment transaction.

Advantageously, embodiments disclosed herein improve the security of all devices and associated data. For example, by requiring validation of encrypted data generated by the contactless card to activate the contactless card, the security of the contactless card is improved. As another example, by presenting terms and conditions specific to a type of the contactless card and/or other user attributes, user privacy and compliance with applicable laws and regulations is improved. Furthermore, doing so removes the need of the card issuer to mail the terms and condition in paper format, thereby conserving resources.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile computing devices 110, and an authentication server 120. The contactless cards 101 are representative of any type of payment cards, such as a credit card, debit card, ATM card, gift card, and the like. The contactless cards 101 may comprise one or more communications interfaces 109, such as a radio frequency identification (RFID) chip, configured to communicate with the computing devices 110 via NFC, the EMV standard, or other short-range protocols in wireless communication. Although NFC is used as an example communications protocol, the disclosure is equally applicable to other types of communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The authentication server 120 is representative of any type of computing device, such as a server, workstation, compute cluster, cloud computing platform, virtualized computing system, and the like.

As shown, a memory 102 of the contactless card includes an applet 103, a counter 104, a private key 105, a diversified key 106, and a unique customer identifier (ID) 107. The applet 103 is executable code configured to perform the operations described herein. The counter 104, private key 105, diversified key 106, and customer ID 107 are used to provide security in the system 100 as described in greater detail below.

As shown, a memory 111 of the mobile device 110 includes an instance of an operating system (OS) 112. Example operating systems 112 include the Android® OS, iOS®, macOS®, Linux®, and Windows® operating systems. As shown, the OS 112 includes an account application 113. The account application 113 allows users to perform various account-related operations, such as activating one or more contactless cards 101, viewing account balances, purchasing items, processing payments, and the like. The account application 113 may further control access permissions to different functions provided by the account application 113. In some embodiments, a user may authenticate using authentication credentials to access certain features of the account application 113. For example, the authentication credentials may include a username (or login) and password, biometric credentials (e.g., fingerprints, Face ID, etc.), and the like.

As stated, the contactless cards 101 may need to be activated before the contactless cards 101 may be used to provide payment data for transactions. To activate a contactless card 101, the user may tap the contactless card 101 to the device 110. Generally, once the contactless card 101 is brought within communications range of the communications interface 118 of the device 110, the applet 103 of the contactless card 101 may generate encrypted data as part of the authentication process required to activate the contactless card 101. For example, in some embodiments, the applet 103 may generate a URL with encrypted data 108 as part of the authentication process required to activate the contactless card 101. To enable NFC data transfer between the contactless card 101 and the mobile device 110, the account application 113 may communicate with the contactless card 101 when the contactless card 101 is sufficiently close to the communications interface 118 of the mobile device 110. The communications interface 118 may be configured to read from and/or communicate with the communications interface 109 of the contactless card 101 (e.g., via NFC, Bluetooth, RFID, etc.). Therefore, example communications interfaces 118 include NFC communication modules, Bluetooth communication modules, and/or RFID communication modules.

As stated, the system 100 is configured to implement key diversification to secure data, which may be referred to as a key diversification technique herein. Generally, the server 120 (or another computing device) and the contactless card 101 may be provisioned with the same private key 105 (also referred to as a master key, or master symmetric key). More specifically, each contactless card 101 is programmed with a unique private key 105 that has a corresponding pair in (or managed by) the server 120. For example, when a contactless card 101 is manufactured, a unique private key 105 may be stored in the memory 102 of the contactless card 101. Similarly, the unique private key 105 may be stored in a record (or profile) of a customer associated with the contactless card 101 in the account data 124 of the server 120 (and/or stored in a different secure location, such as the hardware security module (HSM) 125). The private key 105 may be kept secret from all parties other than the contactless card 101 and server 120, thereby enhancing security of the system 100. In some embodiments, the applet 103 of the contactless card 101 may encrypt and/or decrypt data (e.g., the customer ID 107) using the private key 105 and the data as input a cryptographic algorithm. For example, encrypting the customer ID 107 with the private key 105 may result in an encrypted customer ID. Similarly, the authentication server 120 may encrypt and/or decrypt data associated with the contactless card 101 using the corresponding private key 105.

In some embodiments, the counters 104 and/or private keys 105 of the contactless card 101 and server 120 may be used in conjunction with the counters 104 to enhance security using key diversification. The counters 104 comprise values that are synchronized between a given contactless card 101 and server 120. The counter value 104 may comprise a number that changes each time data is exchanged between the contactless card 101 and the server 120 (and/or the contactless card 101 and the mobile device 110). When preparing to send data (e.g., to the server 120 and/or the mobile device 110), the applet 103 of the contactless card 101 may increment the counter value 104. The contactless card 101 may then provide the private key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety. The applet 103 of the contactless card 101 may include the cryptographic payload as a parameter of the URL with encrypted data 108.

Continuing with the key diversification example, the contactless card 101 may then encrypt the data (e.g., the customer ID 107 and/or any other data) using the diversified key 106 and the data as input to the cryptographic algorithm. For example, encrypting the customer ID 107 with the diversified key 106 may result in an encrypted customer ID. In some embodiments, the encrypted data generated by the contactless card 101 may include a URL. The URL may be directed to the authentication server 120, or some other URL associated with an entity issuing the contactless card 101. In other embodiments, the URL may further be a universal link URL that opens a local resource (e.g., a specific page of the account application 113, such as a card activation page). The URL may further include data (e.g., parameters) used by the authentication server 120 to validate the data generated by the contactless card 101.

For example, if the URL to the authentication server 120 (and/or the URL to the account application 113) is "http://www.example.com/accountapp" and the encrypted data generated based on the aforementioned encryption operations is "ABC123", the URL with encrypted data 108 may be "http://www.example.com/accountapp?data=ABC123". In some embodiments, the applet 103 may encode the encrypted data according to an encoding format compatible with URLs prior to including the encrypted data as a parameter of the URL 108. For example, the encrypted data may be a string of binary data (e.g., zeroes and ones), which may not be compatible with URLs. Therefore, the applet 103 may encode the encrypted data to the American Standard Code for Information Interchange (ASCII) base64 encoding format. Doing so represents the binary encrypted data in an ASCII string format by translating it into a radix-64 representation (e.g., "ABC123" in the previous example). Further still, in embodiments where the URL is directed to a local resource, such as the account application 113, the URL 108 may include an indication of which page of the account application 113 to open. Continuing with the previous example, a page identifier of "1" (or other page identifier, such as a page name, etc.) may be added as a parameter to the URL, and the URL with encrypted data 108 may be "http://www.example.com/accountapp?data=ABC123&p=1".

Once generated, the applet 103 may transmit the URL with encrypted data 108 to the mobile device 110, e.g., via NFC. In one embodiment, when received by the OS 112, the OS 112 causes the web browser 115 to access the URL with encrypted data 108. Doing so causes information describing the mobile device 110 to be sent with the request to access the URL with encrypted data 108. For example, the information may include attributes of the mobile device 110, such as operating system version, hardware capabilities, and software capabilities.

In the embodiment depicted in FIG. 1A, the URL with encrypted data 108 is directed to the server 120, which may include a hypertext transfer protocol (HTTP) server. In one embodiment, the authentication application 123 provides the HTTP server and/or associated functionality. Therefore, the web browser 115 accessing the URL with encrypted data 108 causes the server 120 to receive the URL with encrypted data 108, e.g., in an HTTP request. The authentication application 123 may receive the URL with encrypted data 108 and extract the encrypted data, which may include the encrypted customer ID (e.g., the "ABC123" from the previous example, etc.). The authentication application 123 may convert the encrypted data to the original encoding format (e.g., from ASCII base64 to binary). The account application 113 may similarly perform conversions, e.g., from ASCII base 64 to binary, and vice versa.

The authentication application 123 may then attempt to authenticate the encrypted data. For example, the authentication application 123 may attempt to decrypt the encrypted data using a copy of the private key 105 stored by the server 120. In another example, the authentication application 123 may provide the private key 105 and counter value 104 as input to the cryptographic algorithm, which produces a diversified key 106 as output. The resulting diversified key 106 may correspond to the diversified key 106 of the contactless card 101, which may be used to decrypt the encrypted customer ID 107. Therefore, the authentication application 123 may successfully decrypt the encrypted data, thereby verifying the encrypted data. For example, as stated, a customer ID 107 may be used to generate the encrypted data included in the URL with encrypted data 108. In such an example, the authentication application 123 may decrypt the encrypted data using the private key 105 of the authentication server 120. If the result of the decryption yields the customer ID 107 associated with the account in the account data 124, the authentication application 123 verifies the encrypted data. If the authentication application 123 is unable to decrypt the encrypted data to yield the expected result (e.g., the customer ID 107 of the account associated with the contactless card 101), the authentication application 123 does not verify (or validate or authenticate) the encrypted data. Due to the failed verification, the authentication application 123 may return an error to the web browser 115 and/or otherwise reject the attempted activation of the contactless card 101.

Regardless of the decryption technique used, the authentication application 123 may successfully decrypt the encrypted customer ID 107, thereby verifying the encrypted customer ID 107 (e.g., by comparing the resulting customer ID 107 to a customer ID stored in the account data 124, and/or based on an indication that the decryption using the key 105 and/or 106 was successful). Although the keys 105, 106 are depicted as being stored in the memory 122, the keys 105, 106 may be stored elsewhere, such as in a secure element and/or the HSM 125. In such embodiments, the secure element and/or the HSM 125 may decrypt the encrypted customer ID 107 using the keys 105 and/or 106 and a cryptographic function. Similarly, the secure element and/or HSM 125 may generate the diversified key 106 based on the private key 105 and counter value 104 as described above.

If the authentication application 123 verifies the encrypted customer ID 107 in the URL with encrypted data 108, the authentication application 123 may return a corresponding indication of verification to the web browser 115. The authentication application 123 may then determine a type of the contactless card 101 being activated, e.g., based on a type specified in the account data 124 and/or the card data 126. For example, each card may be associated with a unique identifier that is associated with at least one type of card, of a plurality of card types. The authentication application 123 may further receive data describing attributes of the customer associated with the contactless card 101 being activated, e.g., the customer's address, date of birth, etc. Using the card type and/or the customer attributes, the authentication application 123 may determine a plurality of terms 127 from the card data 126 applicable to the card type and/or the customer data. The terms 127 may generally include terms, conditions, card member agreements, disclosures regarding the use of personal information, legal disclosures, privacy notices, and the like, which may collectively be referred to as "terms" herein. For example, a first card type may have a first plurality of terms (e.g., interest rates, disclosures, etc.), while a second card type may have a second plurality of terms, which may be the same and/or different than the first plurality of terms. Similarly, a customer located in a first state (e.g., based on the customer's address) may be required to receive additional and/or different terms relative to a customer located in a second state. Therefore, based on the customer attributes and/or the card type, the authentication application 123 dynamically determines a specific set of terms required to activate the contactless card 101.

In some embodiments, the authentication application 123 may determine that the contactless card 101 is a replacement for a previously active contactless card. In such embodiments, the user may have previously accepted the custom terms for the previous card, and a reduced set of terms 128 may be determined to activate the contactless card. For example, each contactless card 101 may be associated with an issue and/or manufacture date. The authentication application 123 may determine the dates of the replacement card 101 and the previous card and determine the terms 127 based on the dates. In one embodiment, the authentication application 123 computes a difference of the different terms to determine the reduced set of terms (also referred to as a subset of terms). The authentication application 123 may therefore determine the reduced set of terms that have changed, been added, and/or been removed based on the dates of each card. Doing so allows the authentication application 123 to transmit the reduced set of terms as the custom terms 128 to the web browser 115. However, the full set of terms may be included with the reduced set of terms. The user may then accept the reduced set of terms as part of the activation process of the replacement card 101. In some embodiments, the authentication application 123 may modify the format of the custom terms 128 to reflect which terms have changed for the replacement card. For example, if a new disclosure is added to the custom terms 128 of the replacement card that were not present in the terms 127 of the original card, the authentication application 123 may highlight, bold, italicize, enlarge the font, or otherwise modify the new disclosure such that the user can easily detect the new terms.

Figure 1B:
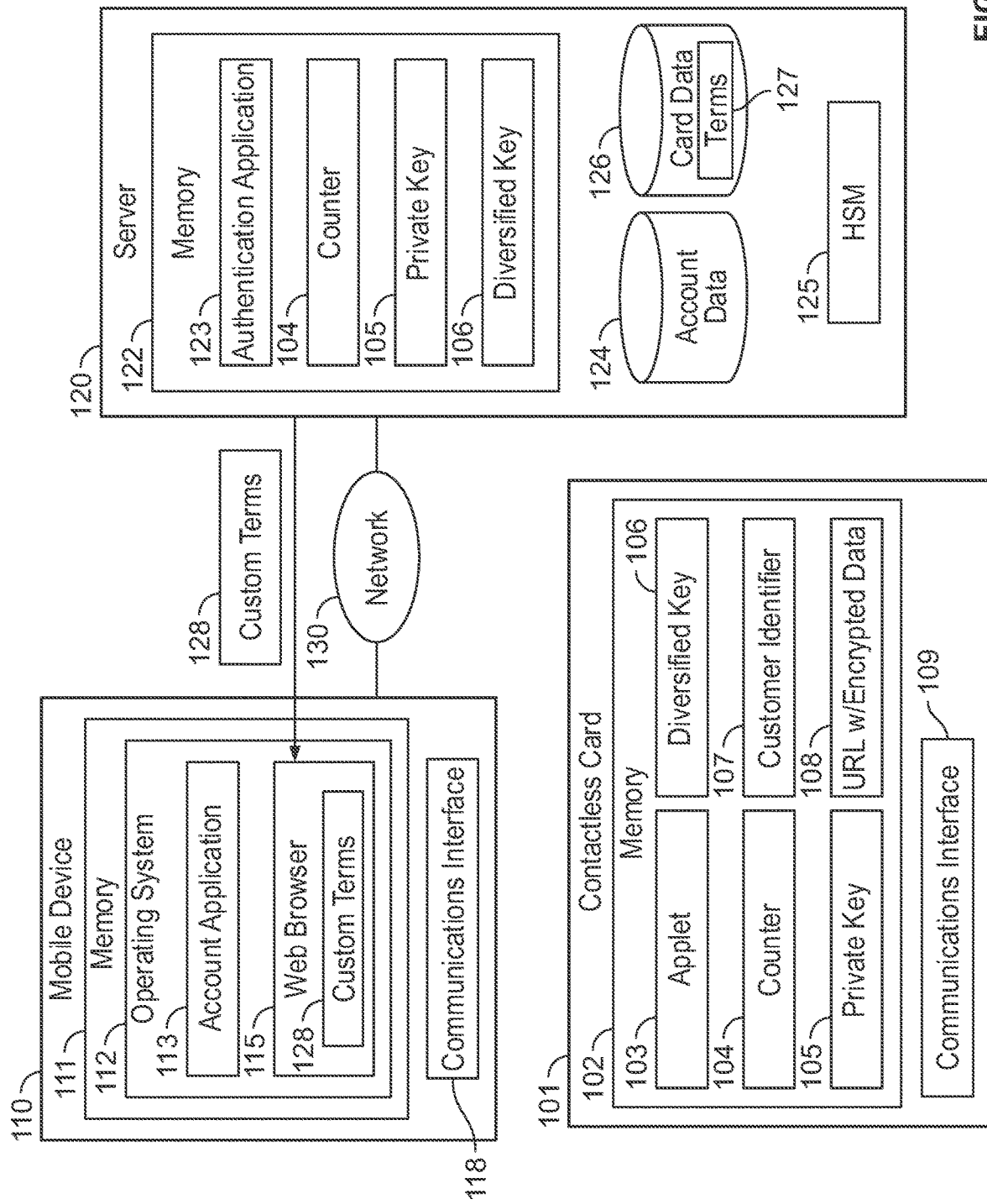

FIG. 1B illustrates an embodiment where the authentication application 123 has decrypted the encrypted customer ID, thereby verifying (or authenticating) the encrypted data in the URL with encrypted data 108, and determined a set of custom terms 128 applicable to the activation of the contactless card 101. As shown, the authentication application 123 transmits the custom terms 128 to the web browser 115, where the custom terms 128 may further indicate that the authentication application 123 successfully decrypted the encrypted customer ID.

Responsive to receiving the custom terms 128, the web browser 115 may output an interface displaying the custom terms 128 for activation of the contactless card 101. The user may then read the custom terms 128 and determine to accept the custom terms 128 to activate the contactless card 101. For example, the user may click a checkbox indicating acceptance of the custom terms 128, provide a signature, etc.

Figure 1C:
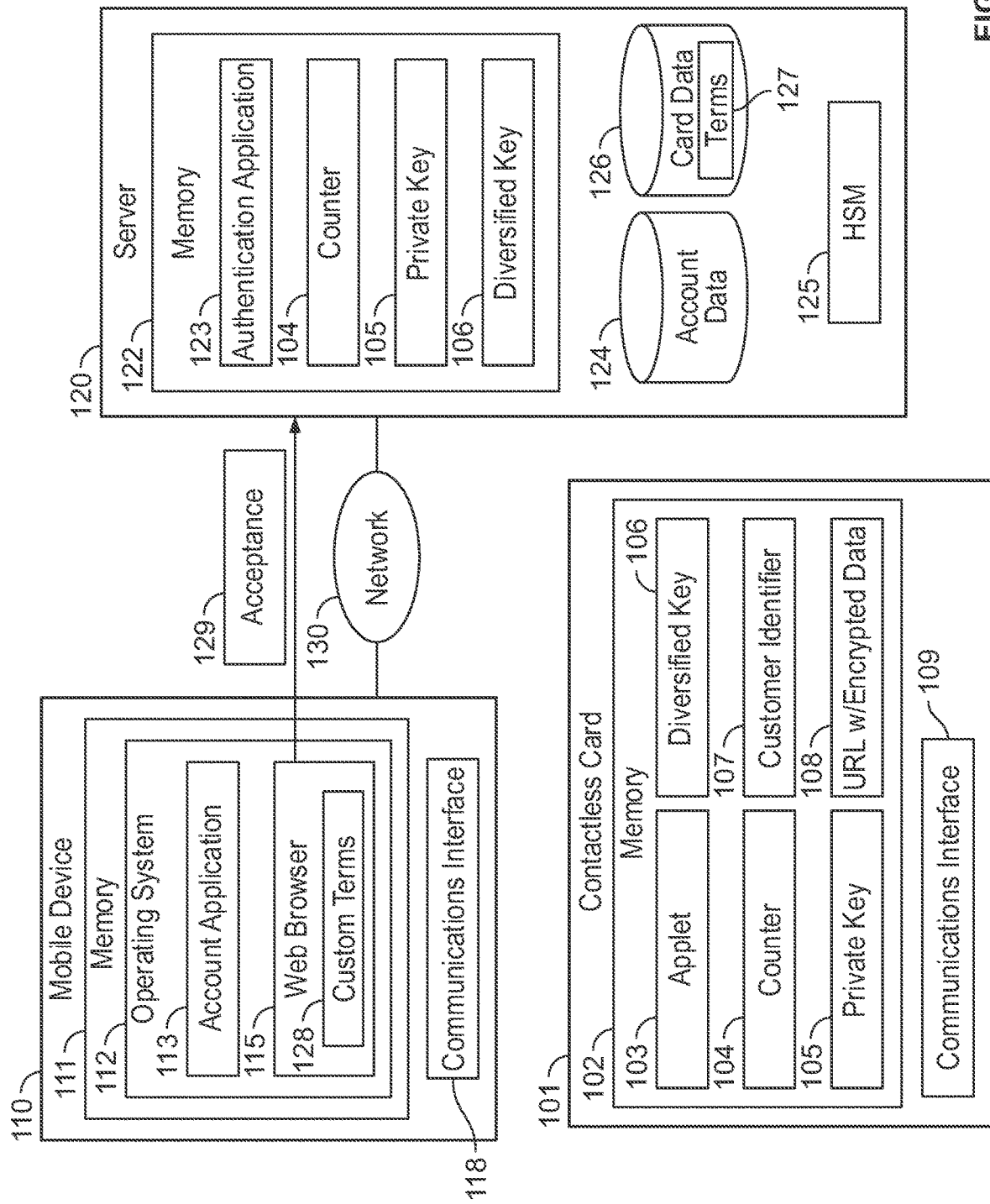

FIG. 1C depicts an embodiment where the user has accepted the custom terms 128 via the web browser 115. As shown, the web browser 115 then transmits an indication of acceptance 129 to the server 120. The authentication application 123 may then receive the acceptance 129, and determine to activate the contactless card 101 based on the successful decryption of the encrypted data included in the URL with encrypted data 108 and the user's acceptance of the custom terms 128. In one embodiment, the authentication application 123 may store an indication in a user profile in the account data 124 and/or the card data 126 indicating the contactless card 101 has been activated. Doing so allows the customer to use the contactless card 101 to provide payment data for transactions and/or provide the card number, expiration date, and/or CVV of the contactless card 101 in virtual interfaces to provide the payment data for transactions.

Figure 2A:
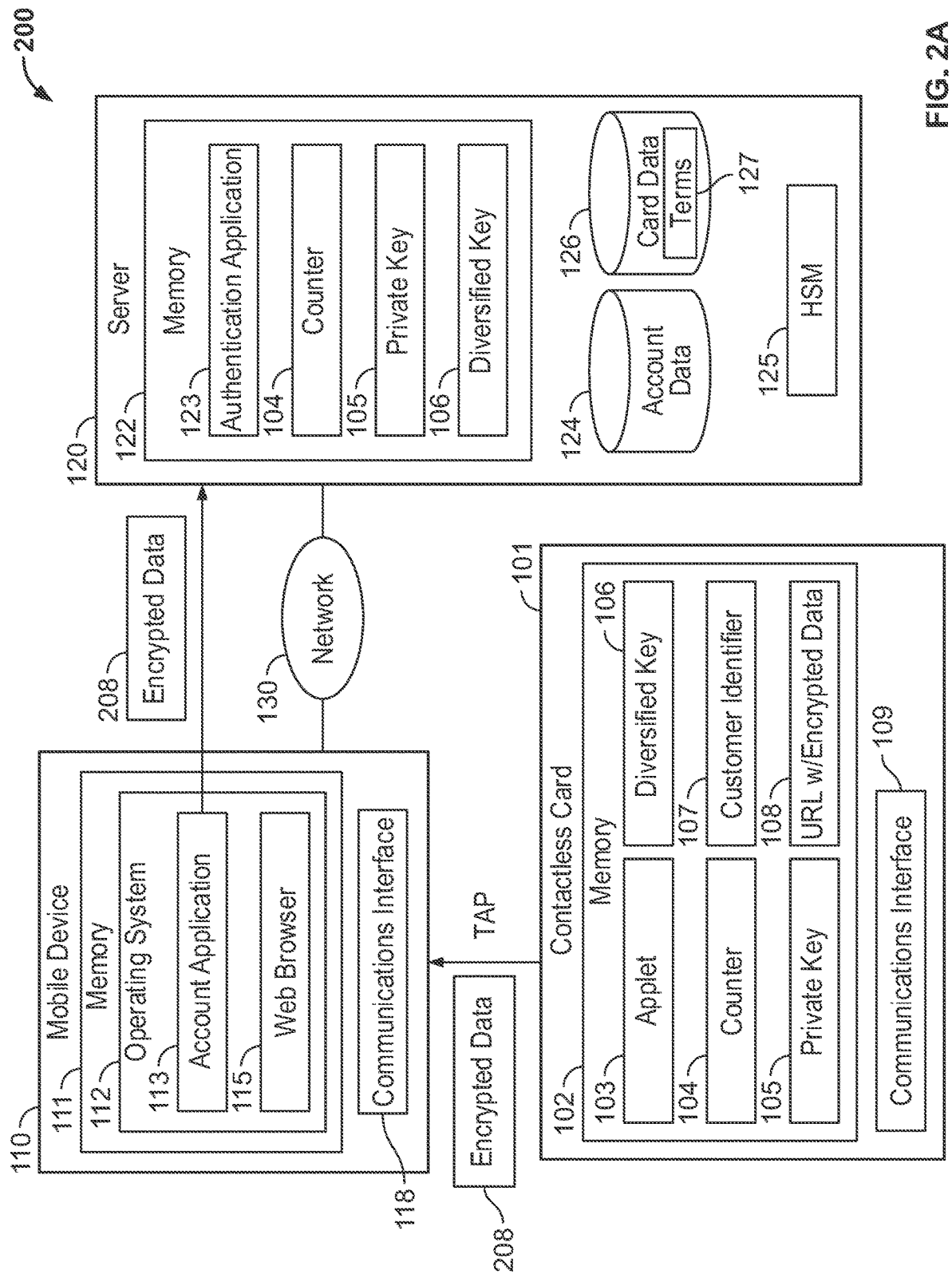
FIGS. 2A-2C illustrate embodiments of a system for determining specific terms for contactless card activation.

FIG. 2A is a schematic 200 depicting an embodiment where the account application 113 is used to activate the contactless card 101. As shown, the user taps the contactless card 101 to the mobile device 110 to proceed with the card activation. In some embodiments, the user may provide authentication credentials to access the account associated with the contactless card 101 prior to tapping the contactless card 101 to the device 110. However, in other embodiments, the user need not be logged in to their account to activate the contactless card 101.

In response to the tap of the contactless card 101, the applet 103 encrypts the customer ID 107, which is transmitted to the account application 113 as at least a portion of encrypted data 208. Generally, the encrypted customer ID included in the encrypted data 208 is generated by the applet 103 as described above with respect to the generation of the URL with encrypted data 108 (e.g., by encrypting the customer ID 107 with the private key 105 and/or the diversified key 106, where the diversified key 106 is generated based on the private key 105 and the counter value 104).

Responsive to receiving the encrypted customer ID in the encrypted data 208, the account application 113 may transmit the encrypted data 208 to the authentication server 120. Once received, the authentication application 123 may attempt to decrypt the encrypted customer ID 208 using the private key 105 and/or the diversified key 106 as described above. If the attempted decryption yields the customer ID 107 associated with the account, the authentication application 123 may transmit an indication of successful validation to the account application 113. Otherwise, if the attempted decryption of the encrypted customer ID 208 is not successful, the authentication application 123 may transmit an indication of the failed decryption to the account application 113, which may reject activation of the contactless card 101. As another example, the authentication application 123 may reject activation of the contactless card 101.

Figure 2B:
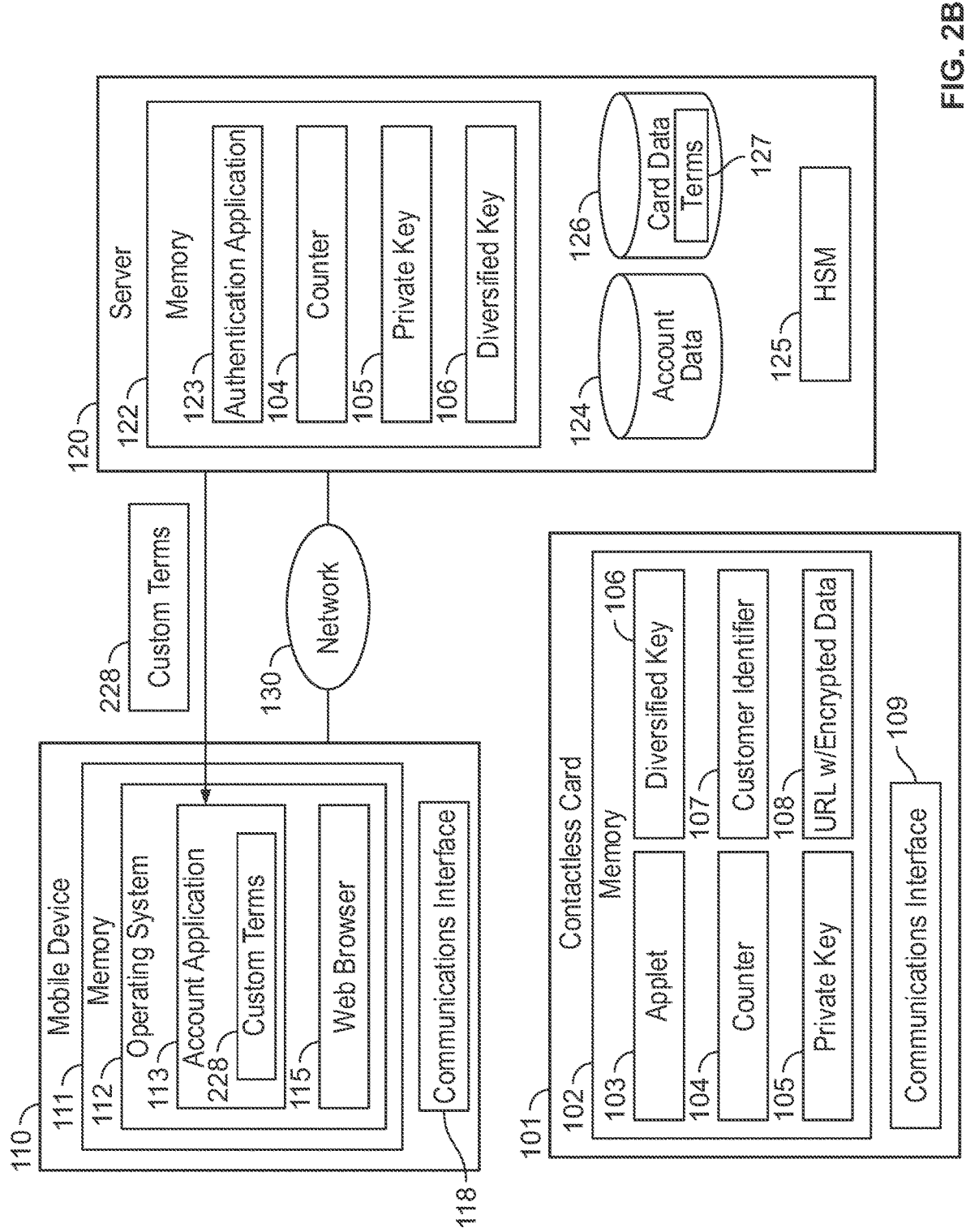

FIG. 2B reflects an embodiment where the authentication application 123 verified the encrypted customer ID included in the encrypted data 208. As stated, the authentication application 123 may determine a type of the card 101, a date of the card 101, or any other attribute of the card 101. The authentication application 123 may further determine one or more attributes of the associated account holder (e.g., name, address, age, etc.). The authentication application 123 may then use the attributes of the card 101 and/or the attributes of the account holder to determine a plurality of custom terms 228 for the contactless card 101. The authentication application 123 may then transmit the custom terms 228 to the account application 113. The account application 113 may then output the custom terms 228 for display on the mobile device 110. As stated, in some embodiments (e.g., where the contactless card 101 is a replacement card), the terms 228 may be a reduced set of terms. In such embodiments, the authentication application 123 and/or the account application 113 may modify the reduced set of terms to improve readability thereof.

Figure 2C:
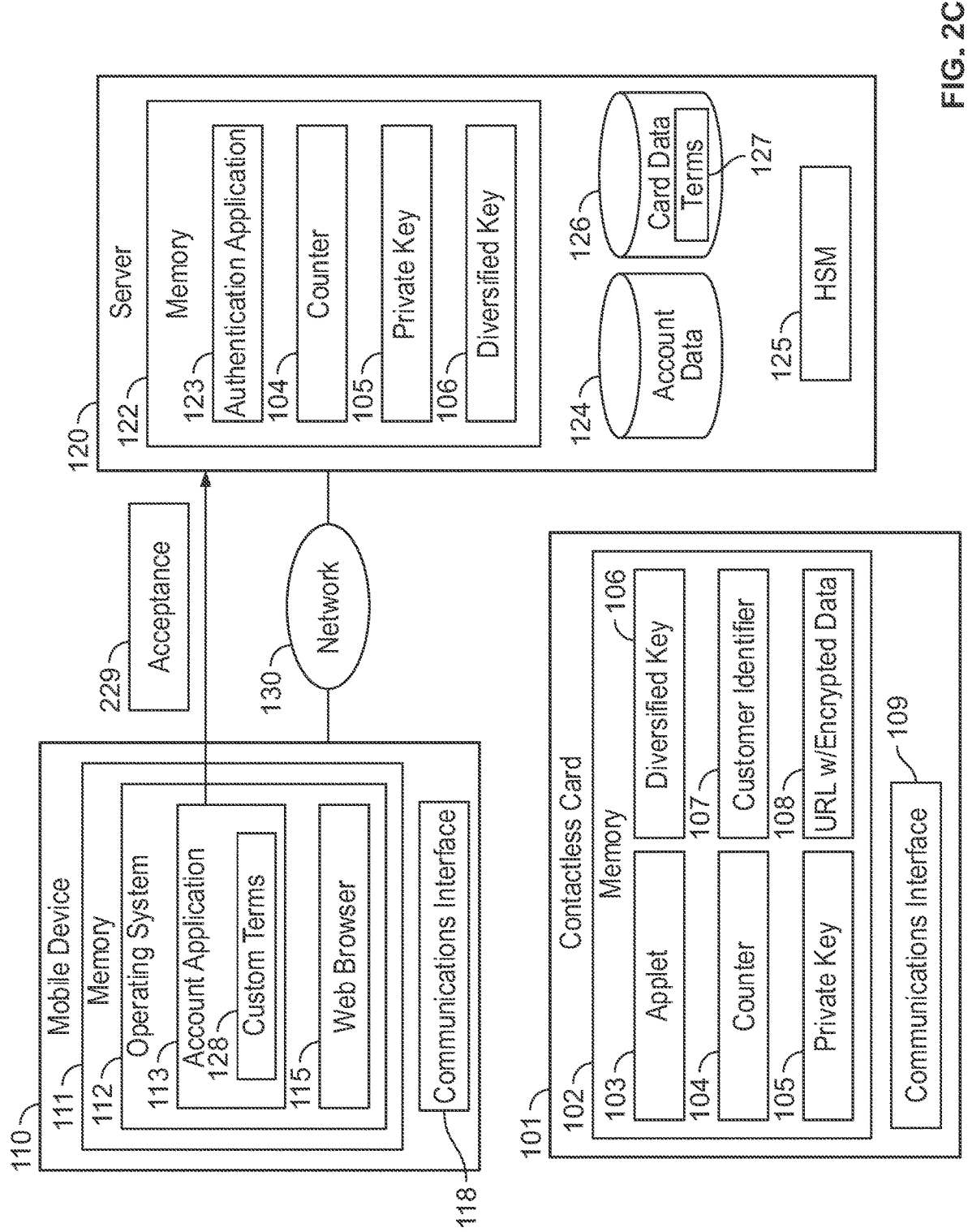

The account application 113 may provide one or more graphical user interface (GUI) elements allowing the user to accept the terms 228. FIG. 2C depicts an embodiment where the user has accepted the terms 228. In the depicted embodiment, the account application 113 transmits an indication of acceptance 229 to the authentication application 123. Once the authentication application 123 receives the acceptance 229, the authentication application 123 may activate the contactless card 101 based on the acceptance of the terms and the verification of the encrypted customer ID 208. For example, the authentication application 123 may store an indication in the account data 124 and/or the card data 126 indicating the contactless card 101 has been activated.

As previously stated, a URL may be directed to the account application 113. Therefore, in such embodiments, the encrypted data 208 generated in FIG. 2A may include a URL directed to a card activation page of the account application 113. In such embodiments, the account application 113 may extract the encrypted customer ID 107 from the URL, optionally decode the encrypted customer ID 107, and transmit the encoded and/or decoded customer ID 107 to the to the server 120 via the network 130. The authentication application 123 may then decrypt the encrypted customer ID 107 to verify the encrypted data.

By requiring validation of encrypted data generated by the contactless card 101 to activate the contactless card 101, embodiments disclosed herein improve the security of the contactless card 101. Furthermore, by presenting terms specific to a type of the contactless card and/or specific to user attributes (e.g. country of residence, state of residence, city of residence, age, legal status, etc.), user privacy and compliance with applicable laws and regulations is improved. Furthermore, doing so removes the need of the card issuer to mail the terms and condition in paper format, thereby conserving resources.

FIG. 3A is a schematic 300 depicting an example embodiment of tapping the contactless card 101 to provide secure activation using custom terms for the contactless card 101. Once the user taps the contactless card 101 to the mobile device 110, the applet 103 of the contactless card 101 encrypts the customer ID 107 to generate the URL with encrypted data 108. The applet 103 may then transmit the URL with encrypted data 108 to the mobile device 110, e.g., via NFC. Once received, the OS 112 may cause the device 110 to access the URL with encrypted data 108. Because no application is in the foreground of the device 110 (e.g., the device displays a home screen of the OS 112), the NFC data transfer may be a background NFC read from the perspective of the device 110. The background NFC read may cause the OS 112 to open an application (e.g. the web browser 115 and/or the account application 113).

In the embodiment depicted in FIG. 3A, the URL with encrypted data 108 may be directed to the server 120 and/or the authentication application 123. As shown in the schematic 310 of FIG. 3B, the OS 112 may launch the web browser 115 and cause the web browser 115 to access the URL with encrypted data 108. As shown, the web browser 115 provides the user with indications specifying that the activation process has been initiated. The authentication application 123 may then attempt to decrypt the encrypted customer ID 107 using the private key 105 and/or the diversified key 106 assigned to the contactless card 101. If the authentication application 123 is unable to decrypt the encrypted customer ID 107 to yield an expected result (e.g., the customer ID 107 of the account, etc.), the authentication application 123 does not verify the encrypted customer ID 107. If the authentication application 123 successfully decrypts the encrypted customer ID 107 to yield an expected result (e.g., the customer ID 107 of the account, etc.), the authentication application 123 verifies the encrypted customer ID 107. As shown in FIG. 3B, the authentication application 123 successfully decrypts the encrypted customer ID, and the authentication application 123 transmits an indication of the verification to the web browser 115. The authentication application 123 may then determine the custom terms for the contactless card 101 based on one or more attributes of the card 101 and/or one or more attributes of the account holder(s).

Figures 3C, 3D:
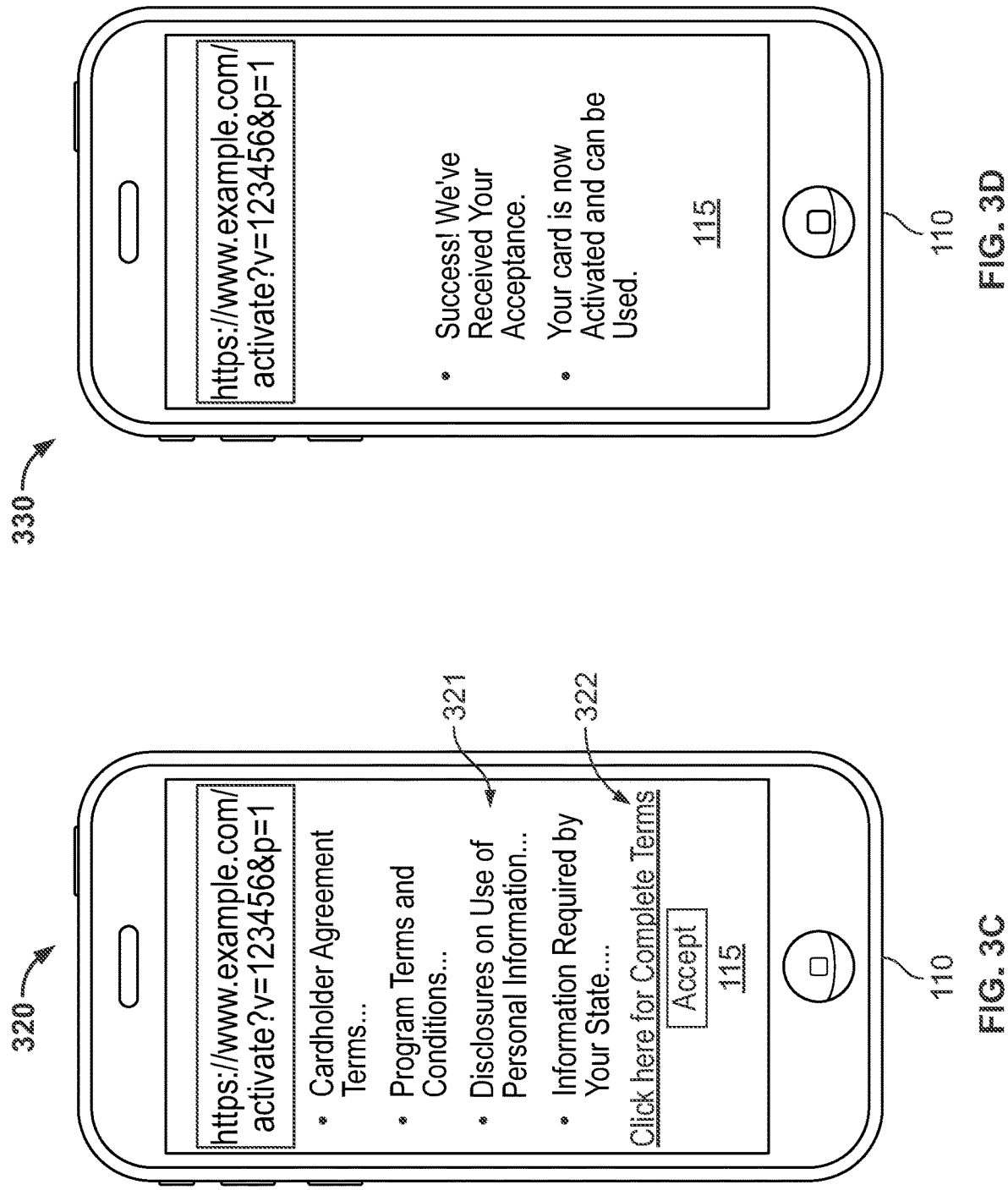

FIG. 3C is a schematic 320 illustrating a simplified portion of the custom terms 127 determined by the authentication application 123 for the contactless card 101 being activated. More specifically, FIG. 3C depicts an embodiment where the contactless card 101 being activated is a replacement of a previous contactless card 101. Therefore, the web browser 115 may output some terms, such as the terms 321, in a modified format, such as bold and italicized font. Doing so may allow the user to easily view the terms. Furthermore, as shown, the web browser may provide a link 322 to the complete terms specific to the account holder and the card 101. Once accessed, the link 322 may cause the web browser 115 to display all relevant terms. The user may select the accept button to accept the terms, which causes the web browser 115 to transmit an indication of acceptance to the authentication application 123. FIG. 3D is a schematic 330 illustrating an embodiment where the authentication application 123 has activated the card 101 for use, and returns a success page to the web browser 115.

FIG. 4A is a schematic 400 depicting an example embodiment of tapping the contactless card 101 to provide secure activation using custom terms for the contactless card 101. As shown, the account application 113 may be executing on the mobile device 110, and instruct the user to tap the contactless card 101 for activation. Once the user taps the contactless card 101 to the mobile device 110, the applet 103 of the contactless card 101 encrypts the customer ID 107. The applet 103 may then transmit the encrypted customer ID 107 to the mobile device 110, e.g., via NFC.

FIG. 4B is a schematic 410 illustrating an embodiment where the account application 113 receives the encrypted customer ID 107 from the contactless card 101. The account application 113 may then transmit the encrypted customer ID 107 to the authentication application 123 for verification. The authentication application 123 may then attempt to decrypt the encrypted customer ID 107 using the private key 105 and/or the diversified key 106 assigned to the contactless card 101. If the authentication application 123 is unable to decrypt the encrypted customer ID 107 to yield an expected result (e.g., the customer ID 107 of the account, etc.), the authentication application 123 does not verify the encrypted customer ID 107. If the authentication application 123 successfully decrypts the encrypted customer ID 107 to yield an expected result (e.g., the customer ID 107 of the account, etc.), the authentication application 123 verifies the encrypted customer ID 107. As shown in FIG. 4B, the authentication application 123 successfully decrypts the encrypted customer ID, and the authentication application 123 transmits an indication of the verification to the web browser 115. The authentication application 123 may then determine the custom terms for the contactless card 101 based on one or more attributes of the card 101 and/or one or more attributes of the account holder(s).

FIG. 4C is a schematic 420 illustrating a simplified portion of the custom terms 127 determined by the authentication application 123 for the contactless card 101 being activated. More specifically, FIG. 4C depicts an embodiment where the contactless card 101 being activated is not a replacement of a previous contactless card 101. Therefore, the account application 113 may output all terms received from the authentication application 123. While not depicted in FIG. 4C (or FIG. 3C) for the sake of clarity, the complete set of terms may be displayed on the device 110. The user may select the accept button to accept the terms, which causes the account application 113 to transmit an indication of acceptance to the authentication application 123. FIG. 4D is a schematic 430 illustrating an embodiment where the authentication application 123 has activated the card 101 for use, and returns a success page to the account application 113.

Figure 5A:
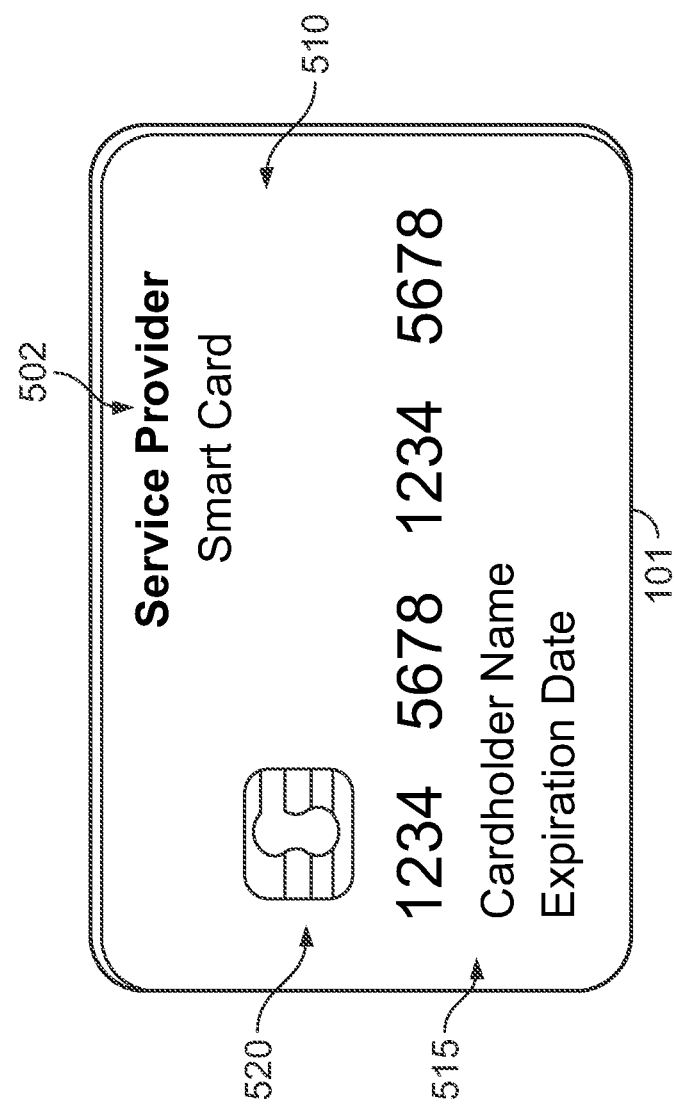
FIGS. 5A-5B illustrate an example contactless card.

FIG. 5A illustrates a contactless card 101, which may comprise a payment card, such as a credit card, debit card, and/or a gift card. As shown, the contactless card 101 may be issued by a service provider 502 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 510, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 515 displayed on the front and/or back of the card, and a contact pad 520. The contact pad 520 may be configured to establish contact with another communication device, such as the mobile devices 110, a user device, smart phone, laptop, desktop, or tablet computer. The contactless card 101 may also include processing circuitry, antenna and other components not shown in FIG. 5A. These components may be located behind the contact pad 520 or elsewhere on the substrate 510. The contactless card 101 may also include a magnetic strip or tape, which may be located on the back of the card (not shown in FIG. 5A).

Figure 5B:
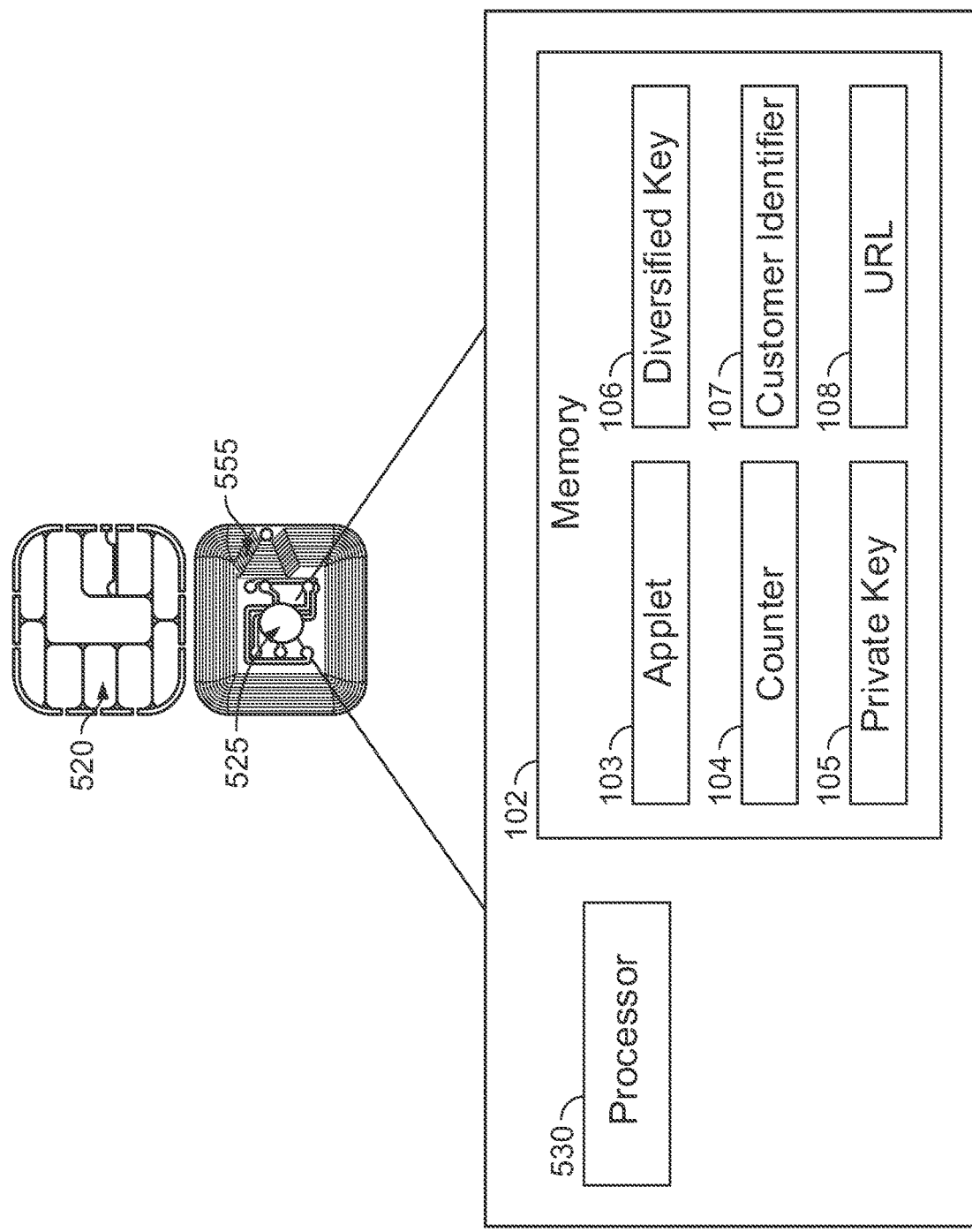

As illustrated in FIG. 5B, the contact pad 520 of contactless card 101 may include processing circuitry 525 for storing and processing information, including a microprocessor 530 and the memory 102. It is understood that the processing circuitry 525 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to store one or more applets 103, the counter value 104, private key 105, the diversified key 106, and one or more customer (or user) IDs 107. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The customer ID 107 may comprise a unique alphanumeric identifier assigned to a user of the contactless card 101, and the identifier may distinguish the user of the contactless card from other contactless card users. In some examples, the customer ID 107 may identify both a customer and an account assigned to that customer and may further identify the contactless card associated with the customer's account. In some embodiments, the applet 103 may use the customer ID 107 as input to a cryptographic algorithm with the keys 105 and/or 106 to encrypt the customer ID 107. Similarly, the applet 103 may construct a URL that includes the encrypted customer ID 107 as a parameter. The URL may be directed to the server 120 and/or the account application 113.

The processor and memory elements of the foregoing exemplary embodiments are described with reference to the contact pad, but the present disclosure is not limited thereto. It is understood that these elements may be implemented outside of the pad 520 or entirely separate from it, or as further elements in addition to processor 530 and memory 102 elements located within the contact pad 520.

In some examples, the contactless card 101 may comprise one or more antennas 555. The one or more antennas 555 may be placed within the contactless card 101 and around the processing circuitry 525 of the contact pad 520. For example, the one or more antennas 555 may be integral with the processing circuitry 525 and the one or more antennas 555 may be used with an external booster coil. As another example, the one or more antennas 555 may be external to the contact pad 520 and the processing circuitry 525.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 555, processing circuitry 525, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., the communications interface 118 of the device 110), and produce an NDEF message that comprises a cryptographically secure OTP (e.g., an encrypted customer ID) encoded as an NDEF text tag.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
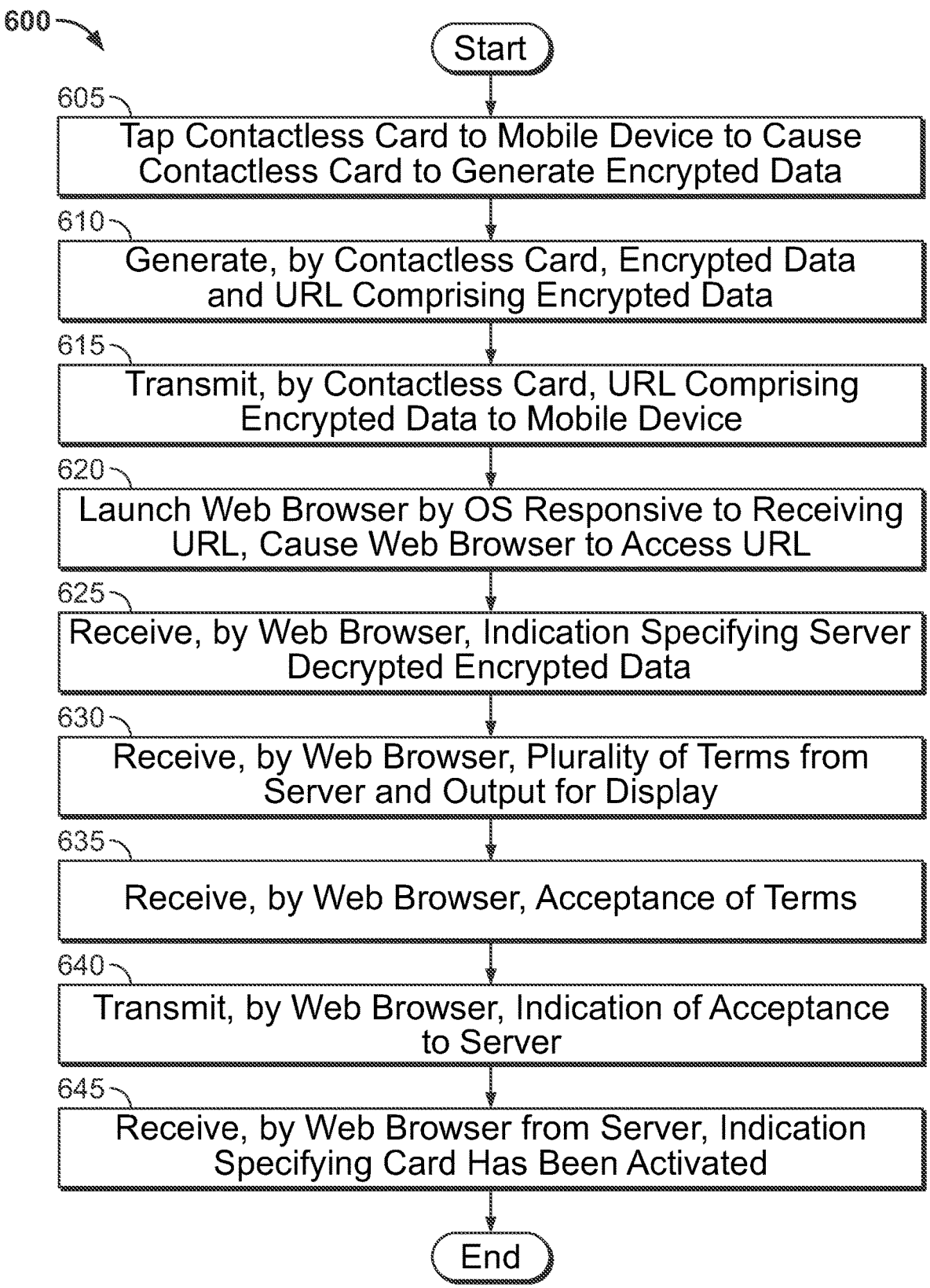
FIG. 6 illustrates an embodiment of a first logic flow.

FIG. 6 illustrates an embodiment of a logic flow 600. The logic flow 600 may be representative of some or all of the operations executed by one or more embodiments described herein. For example, the logic flow 600 may include some or all of the operations to activate a contactless card 101 using terms specific to the contactless card and the account holder. Embodiments are not limited in this context.

As shown, the logic flow 600 begins at block 605, where a user taps the contactless card 101 to the mobile device 110 to cause the applet 103 of the contactless card 101 to generate encrypted data. At block 610, the applet 103 generates the customer ID 107 as part of a URL with encrypted data. At block 615, the applet transmits the URL with encrypted data to the mobile device 110. At block 620, the OS 112 may launch the web browser 115 to access the URL with encrypted data, which may be directed to the server 120 and/or the authentication application 123. The server 120 may attempt to decrypt the encrypted customer ID included in the URL as described herein. At block 625, the web browser 115 receives an indication from the server 120 that the encrypted customer ID 107 was verified by decrypting the encrypted customer ID 107. Doing so may cause the server 120 to determine the terms that are specific to the account holder and the contactless card 101.

At block 630, the web browser 115 receives the plurality of terms from the server 120 and outputs the terms for display. At block 635, the web browser 115 receives acceptance of the terms from the user. At block 640, the web browser 115 transmits an indication of the acceptance to the server 120. Doing so may cause the server 120 to activate the contactless card 101. At block 645, the web browser 115 may receive and output an indication from the server specifying that the contactless card 101 has been activated.

Figure 7:
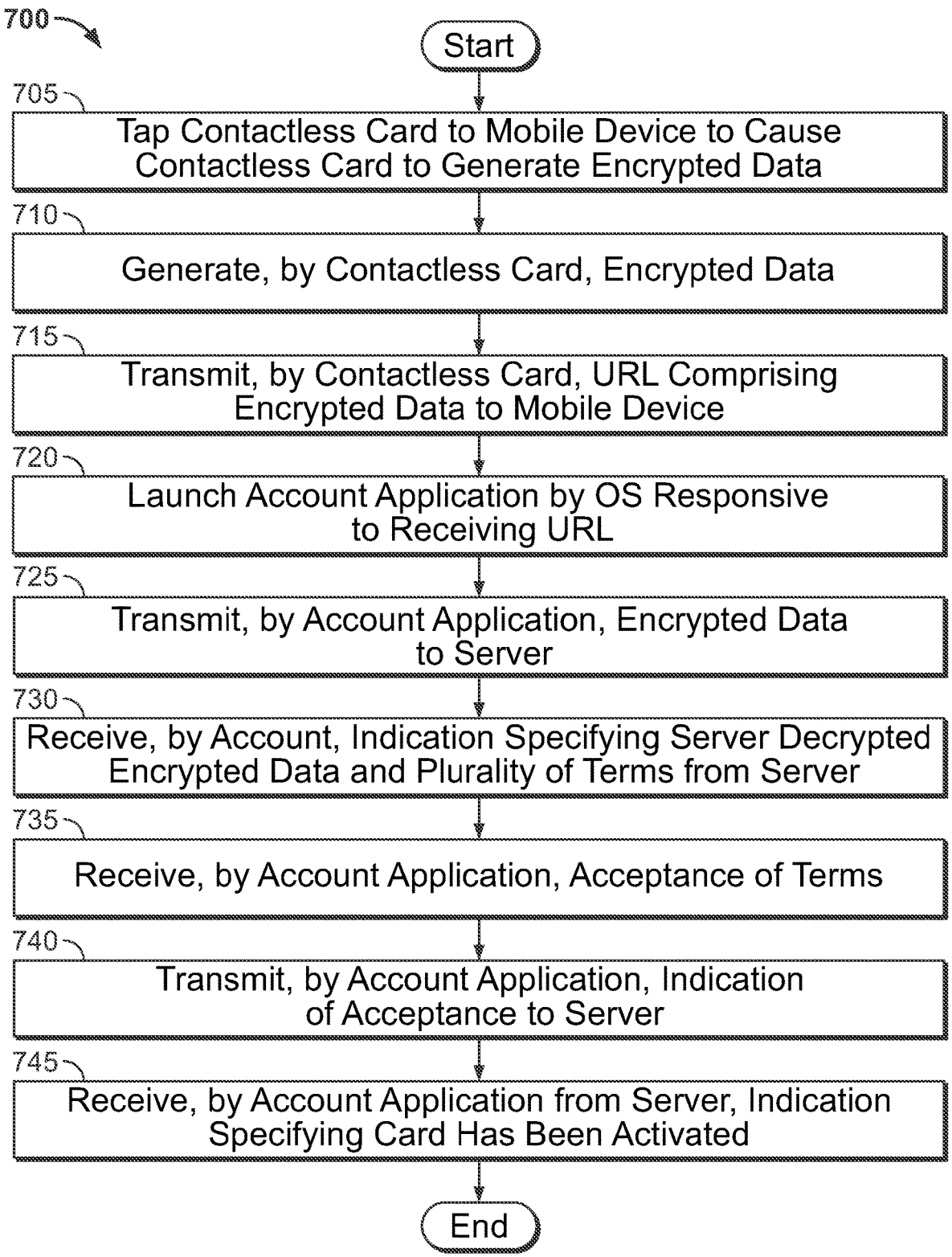
FIG. 7 illustrates an embodiment of a second logic flow.

FIG. 7 illustrates an embodiment of a logic flow 700. The logic flow 700 may be representative of some or all of the operations executed by one or more embodiments described herein. For example, the logic flow 700 may include some or all of the operations to activate a contactless card 101 using terms specific to the contactless card and the account holder. Embodiments are not limited in this context.

As shown, the logic flow 700 begins at block 705, where a user taps the contactless card 101 to the mobile device 110 to cause the applet 103 of the contactless card 101 to generate encrypted data. At block 710, the applet 103 generates the encrypted customer ID 107, which may be part of a URL with encrypted data, where the URL is directed to an activation page of the account application 113. At block 715, the applet transmits the URL with encrypted data to the mobile device 110. At block 720, the OS 112 may launch the account application 113 and open the card activation page responsive to receiving the URL with encrypted data 108. At block 725, the account application 113 transmits the received encrypted data (e.g., the encrypted customer ID 107) to the server 120. In one embodiment, the account application extracts the encrypted data (e.g., the encrypted customer ID 107) from the URL 108 before transmitting the encrypted data to the server. In another embodiment, the account application 113 transmits the URL with encrypted data 108 to the server 120. The server 120 may then attempt to decrypt the encrypted data as described herein. Doing so may cause the server 120 to determine the terms that are specific to the account holder and the contactless card 101.

At block 730, the account application 113 receives an indication from the server 120 that the encrypted customer ID 107 was verified by decrypting the encrypted customer ID 107 and the determined plurality of terms. At block 735, the account application 113 receives acceptance of the terms from the user. At block 740, the account application 113 transmits an indication of the acceptance to the server 120. Doing so may cause the server 120 to activate the contactless card 101. At block 745, the account application 113 may receive and output an indication from the server specifying that the contactless card 101 has been activated.

Figure 8:
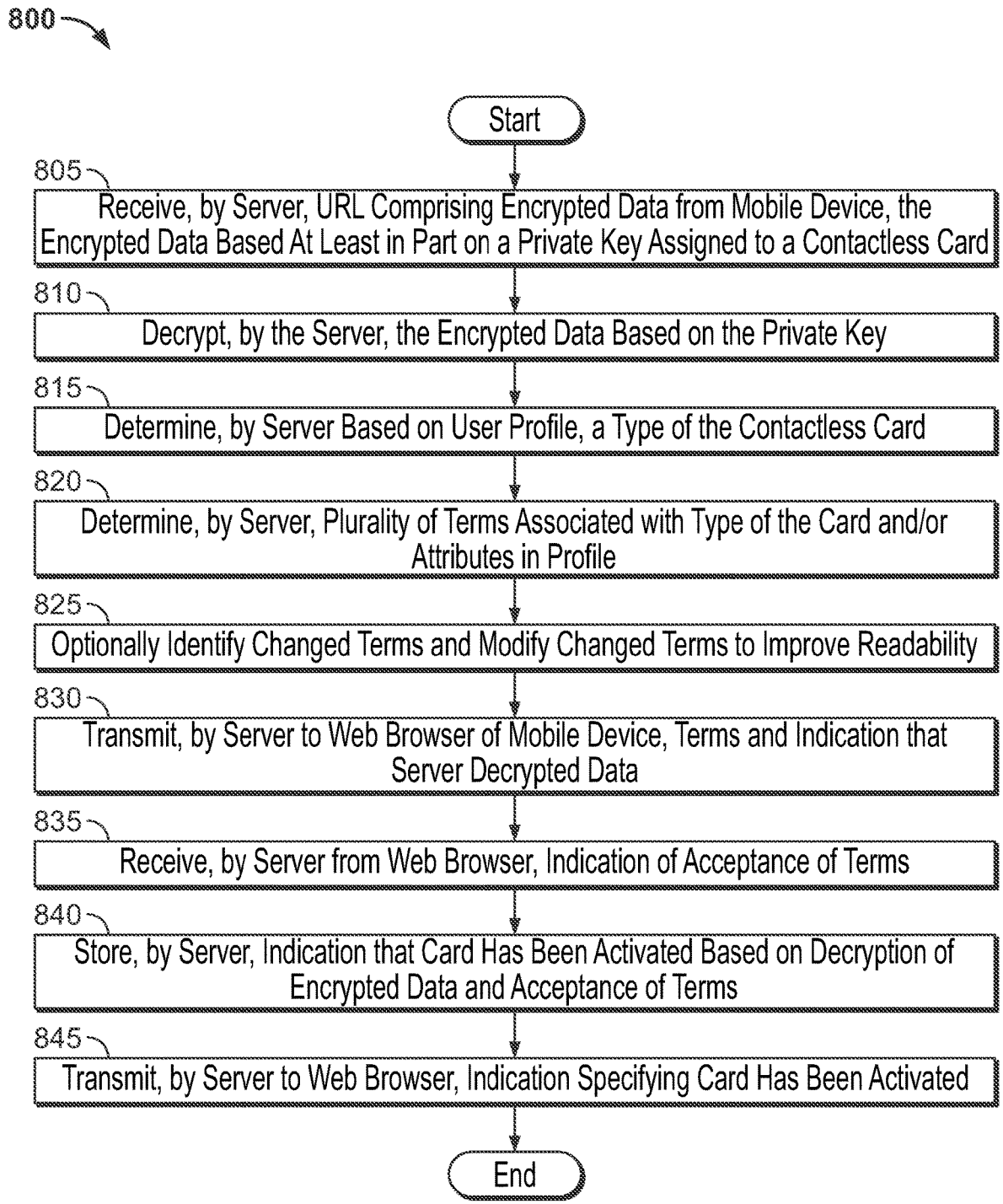
FIG. 8 illustrates an embodiment of a third logic flow.

FIG. 8 illustrates an embodiment of a logic flow 800. The logic flow 800 may be representative of some or all of the operations executed by one or more embodiments described herein. For example, the logic flow 800 may include some or all of the operations to activate a contactless card 101 using terms specific to the contactless card and the account holder. Embodiments are not limited in this context.

As shown, the logic flow 800 begins at block 805, where the server 120 receives a URL comprising encrypted data from a web browser 115 executing on a mobile device 110. The URL with encrypted data may be generated by the applet 103 of the contactless card 101 based at least in part on the private key assigned to the contactless card 101. At block 810, the server 120 may decrypt the encrypted data based on an instance of the private key maintained by the server 120. At block 815, the server 120 determines a type of the contactless card 101. For example, a unique identifier of the contactless card 101 may be stored in the account data 124 and/or the card data 126. The unique identifier may be used to determine a type of the card, e.g., in the card data 126. The card data 126 may specify the type of the card, a date the card was issued, and any related terms 127 for the card. At block 820, the server 120 determines the plurality of terms for the card and/or terms based on user attributes, such as age, residence, credit limits, etc.

At block 825, the server 120 may optionally identify any changed terms for the card, e.g., when the card is a replacement for a previous card held by the account holder. The server 120 may modify the changed terms (e.g., highlight, bold, increase font size, etc.) of the changed terms to improve readability on the user's device. At block 830, the server 120 transmits an indication to the web browser 115 that the server 120 decrypted the encrypted data, thereby verifying the encrypted data. The server 120 may further transmit the terms determined at block 820, which may be outputted for display by the web browser 115. At block 835, the server 120 receives an indication from the web browser 115 specifying that the user accepted the terms. At block 840, the server 120 stores an indication (e.g., in the account data 124) indicating that the card has been activated for use based on the acceptance of the terms and the decryption of the encrypted data. At block 845, the server 120 transmits an indication to the web browser 115 indicating the card has been activated. The web browser 115 may display the indication on a display.

Figure 9:
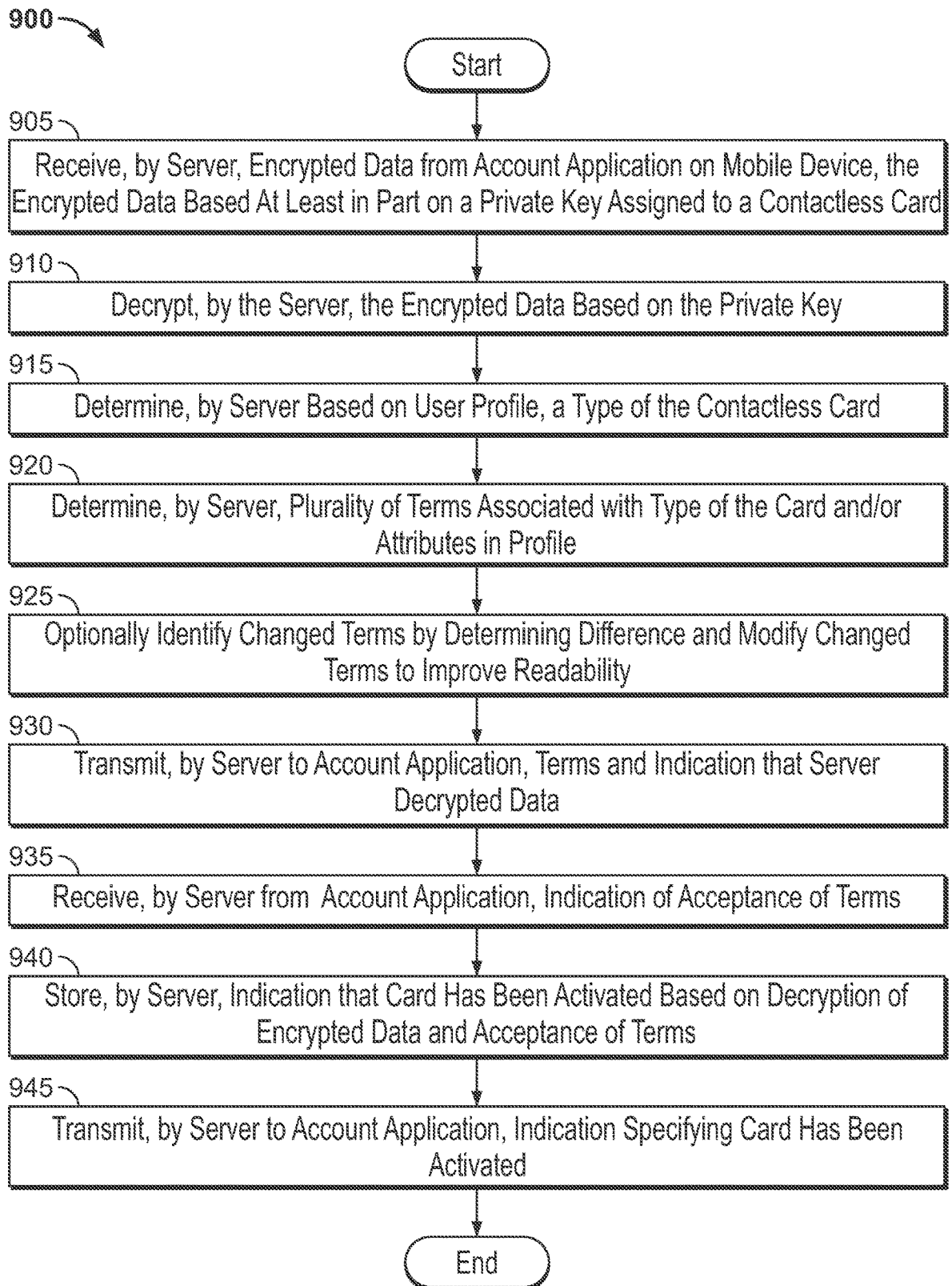
FIG. 9 illustrates an embodiment of a fourth logic flow.

FIG. 9 illustrates an embodiment of a logic flow 900. The logic flow 900 may be representative of some or all of the operations executed by one or more embodiments described herein. For example, the logic flow 900 may include some or all of the operations to activate a contactless card 101 using terms specific to the contactless card and the account holder. Embodiments are not limited in this context.

As shown, the logic flow 900 begins at block 905, where the server 120 receives encrypted data from an account application 113 executing on a mobile device 110. The encrypted data may be generated by the applet 103 of the contactless card 101 based at least in part on the private key assigned to the contactless card 101. In some embodiments, the applet 103 includes the encrypted data as a parameter of a URL with encrypted data. At block 910, the server 120 may decrypt the encrypted data based on an instance of the private key maintained by the server 120. At block 915, the server 120 determines a type of the contactless card 101. For example, a unique identifier of the contactless card 101 may be stored in the account data 124 and/or the card data 126. The unique identifier may be used to determine a type of the card, e.g., in the card data 126. The card data 126 may specify the type of the card, a date the card was issued, and any related terms 127 for the card. At block 920, the server 120 determines the plurality of terms for the card and/or terms based on user attributes, such as age, residence, credit limits, etc.

At block 925, the server 120 may optionally identify any changed terms for the card, e.g., when the card is a replacement for a previous card held by the account holder. The server 120 may modify the changed terms (e.g., highlight, bold, increase font size, etc.) of the changed terms to improve readability on the user's device. At block 930, the server 120 transmits an indication to the account application 113 that the server 120 decrypted the encrypted data, thereby verifying the encrypted data. The server 120 may further transmit the terms determined at block 920, which may be outputted for display by the account application 113. At block 935, the server 120 receives an indication from the account application 113 specifying that the user accepted the terms. At block 940, the server 120 stores an indication (e.g., in the account data 124) indicating that the card has been activated for use based on the acceptance of the terms and the decryption of the encrypted data. At block 945, the server 120 transmits an indication to the account application 113 indicating the card has been activated. The account application 113 may display the indication on a display.

Figure 10:
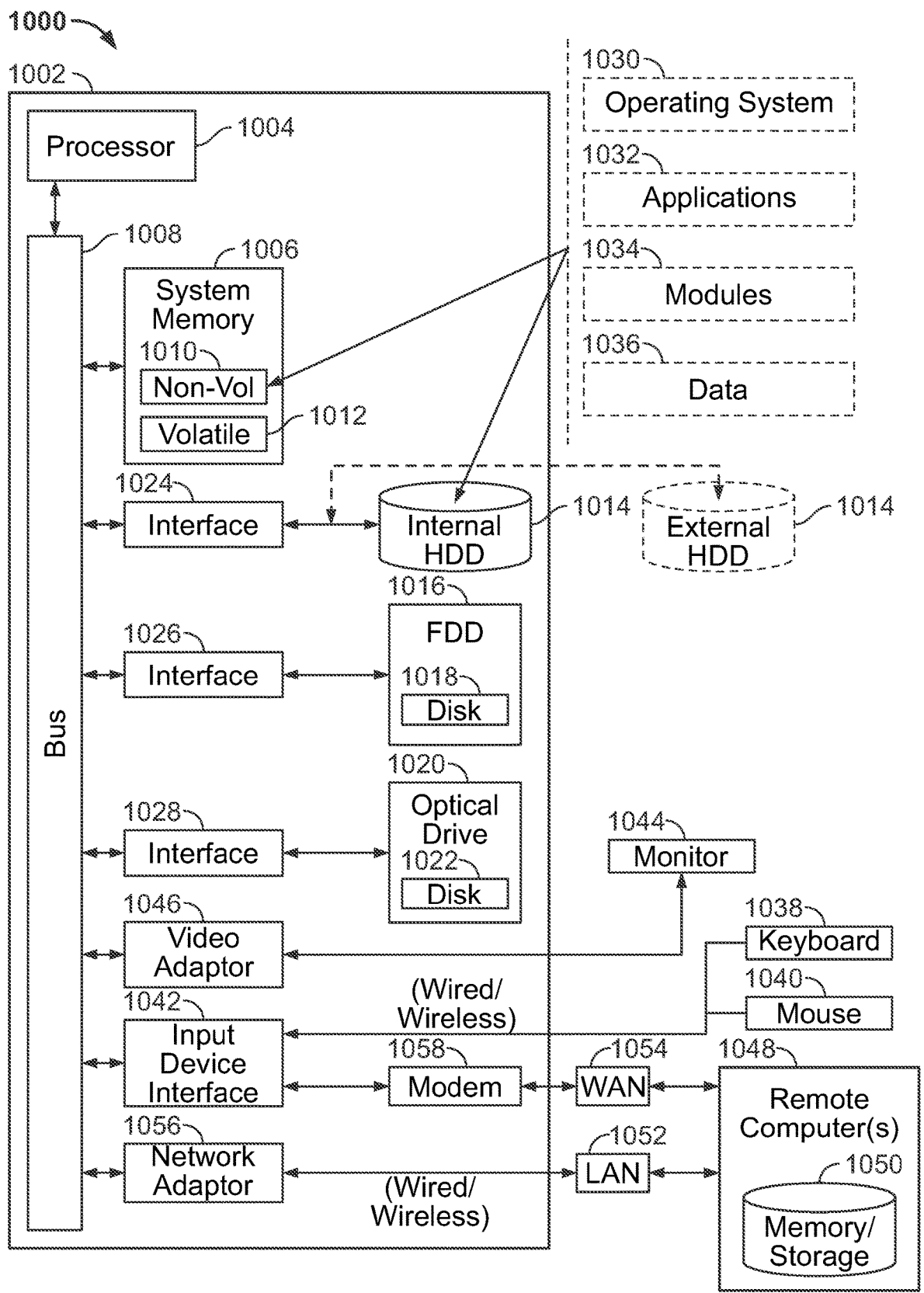
FIG. 10 illustrates an embodiment of a computing system.

FIG. 10 illustrates an embodiment of an exemplary computing architecture 1000 comprising a computing system 1002 that may be suitable for implementing various embodiments as previously described. In various embodiments, the computing architecture 1000 may comprise or be implemented as part of an electronic device. In some embodiments, the computing architecture 1000 may be representative, for example, of a system that implements one or more components of the system 100. In some embodiments, computing system 1002 may be representative, for example, of the contactless card 101, mobile devices 110, and authentication server 120 of the system 100. The embodiments are not limited in this context. More generally, the computing architecture 1000 is configured to implement all logic, applications, systems, methods, apparatuses, and functionality described herein with reference to FIGS. 1-9.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 1002 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 1002.

As shown in FIG. 10, the computing system 1002 comprises a processor 1004, a system memory 1006 and a system bus 1008. The processor 1004 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 1004.

The system bus 1008 provides an interface for system components including, but not limited to, the system memory 1006 to the processor 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computing system 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies. The computing system 1002 is generally is configured to implement all logic, systems, methods, apparatuses, and functionality described herein with reference to FIGS. 1-9.

The drives and associated computer-readable media provide volatile and/or nonvolatile storage of data, data structures, computer-readable instructions, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 100, e.g., the applet 103, counter 104, private key 105, diversified key 106, customer ID 107, operating system 112, account application 113, web browser 115, the authentication application 123, the account data 124, the card data 126, terms 127, URL with encrypted data 108, and/or the encrypted data 208.

A user can enter commands and information into the computing system 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computing system 1002. In addition to the monitor 1044, a computer typically includes other peripheral output devices, such as speakers, printers, and so forth.

The computing system 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computing system 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 1052 and the WAN 1054.

When used in a LAN networking environment, the computing system 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computing system 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computing system 1002, or portions thereof, can be stored in the remote memory/storage device 1050. It will be appreciated that the network connections shown are exemplary and other means of establishing a communications link between the computers can be used.

The computing system 1002 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A non-transitory computer-readable storage medium having computer-readable program code embodied therewith, the computer-readable program code executable by a processor to cause the processor to:
    receive, by an application executing on the processor from an account application executing on a device and via a network, authentication credentials associated with an account;
    determine, by the application, that the authentication credentials are valid to access the account;
    receive, by the application, a request to activate a contactless card assigned to the account, the request specifying a uniform resource locator (URL), a parameter of the URL comprising encrypted data, the encrypted data based at least in part on a private key assigned to the contactless card, wherein the URL is generated by the contactless card and read by the device;
    decrypt, by the application, the encrypted data based on the private key;
    determine, by the application, that the contactless card is a first type of contactless card, the first type of contactless card one of a plurality of types of contactless cards;
    determine, by the application, a plurality of terms associated with the first type of contactless card;
    transmit, by the application, the determined plurality of terms to the account application executing on the device;
    receive, by the application from the account application, an indication specifying acceptance of the plurality of terms; and
    storing, by the application based on the decryption of the encrypted data and the received indication specifying acceptance of the plurality of terms, an indication in a database specifying the contactless card is activated for use.

2. The non-transitory computer-readable storage medium of claim 1, the computer-readable program code executable by the processor to cause the processor to:
    determine the contactless card is of the first type of contactless card based on a unique identifier assigned to the contactless card; and
    transmit an indication to the account application executing on the device specifying that the contactless card is activated for use.

3. The non-transitory computer-readable storage medium of claim 1, the computer-readable program code executable by the processor to cause the processor to:
    encrypt, by the application, a counter value and the private key to generate a diversified key; and decrypt, by the application, the encrypted data using the diversified key.

4. The non-transitory computer-readable storage medium of claim 1, the computer-readable program code executable by the processor to cause the processor to:
receive, by the application, a plurality of attributes from a user profile associated with the contactless card, the plurality of attributes comprising at least the first type of contactless card and an address associated with the contactless card; and
determine, by the application, the plurality of terms based on the first type of contactless card and the address associated with the contactless card, wherein at least one term of the plurality of terms is based on the address.

5. The non-transitory computer-readable storage medium of claim 1, the computer-readable program code executable by the processor to cause the processor to:
determine, by the application based on a user profile associated with the contactless card, that the contactless card is a replacement of a previous contactless card specified in the user profile;
determine, by the application, a date of the previous contactless card;
determine, by the application, a previous plurality of terms associated with the previous contactless card; and
determine, by the application based on the date of the previous contactless card and a date of the contactless card, a subset of the plurality of terms associated with the contactless card that have changed relative to the plurality of terms associated with the previous contactless card.

6. The non-transitory computer-readable storage medium of claim 5, the computer-readable program code executable by the processor to cause the processor to:
format, by the application, the subset of the plurality of terms according to a modified format, wherein the modified format comprises one or more of a highlight effect, a bold effect, or an italics effect applied to the subset of the plurality of terms; and
transmit, by the application, the formatted subset of the plurality of terms to the account application.

7. The non-transitory computer-readable storage medium of claim 6, the computer-readable program code executable by the processor to cause the processor to:
transmit, by the application to the account application executing on the device, a uniform resource locator (URL) directed to the plurality of terms associated with the contactless card.

8. A system, comprising:
a processor; and
a memory storing instructions which when executed by the processor, cause the processor to:
receive, by an application executing on the processor via a network, a request from a device specifying a uniform resource locator (URL), a parameter of the URL comprising encrypted data, the encrypted data based at least in part on a private key assigned to a contactless card, the request to activate the contactless card, wherein the URL is generated by the contactless card and read by the device;
decrypt, by the application, the encrypted data based on an instance of the private key stored in the memory;
determine, by the application based at least in part on a profile, that the contactless card is a first type of contactless card, the first type of contactless card one of a plurality of types of contactless cards;
determine, by the application, a plurality of terms associated with the first type of contactless card;
transmit, by the application, the determined plurality of terms to a web browser executing on the device;
receive, by the application from the web browser, an indication specifying acceptance of the plurality of terms; and
store, by the application based on the decryption of the encrypted data and the received indication specifying acceptance of the plurality of terms, an indication in a database specifying the contactless card is activated for use.

9. The system of claim 8, the memory storing instructions which when executed by the processor, cause the processor to:
determine the contactless card is of the first type of contactless card based on a unique identifier assigned to the contactless card; and
transmit an indication to the web browser executing on the device specifying that the contactless card is activated for use.

10. The system of claim 8, the memory storing instructions which when executed by the processor, cause the processor to:
extract, by the application, the encrypted data from the URL; and
decode, by the application, the extracted encrypted data prior to the decryption.

11. The system of claim 8, the memory storing instructions which when executed by the processor, cause the processor to:
extract, by the application, a counter value from the encrypted data;
encrypt, by the application, the counter value and the private key to generate a diversified key; and
decrypt, by the application, the encrypted data using the diversified key.

12. The system of claim 8, the memory storing instructions which when executed by the processor, cause the processor to:
receive, by the application, a plurality of attributes from the profile, the plurality of attributes comprising at least the first type of contactless card and an address associated with the contactless card; and
determine, by the application, the plurality of terms based on the first type of contactless card and the address associated with the contactless card, wherein at least one term of the plurality of terms is based on the address.

13. The system of claim 8, the memory storing instructions which when executed by the processor, cause the processor to:
determine, by the application based on a user profile associated with the contactless card, that the contactless card is a replacement of a previous contactless card specified in the user profile;
determine, by the application, a date of the previous contactless card;
determine, by the application, a previous plurality of terms associated with the previous contactless card;
determine, by the application based on the date of the previous contactless card and a date of the contactless card, a subset of the plurality of terms associated with the contactless card that have changed relative to the plurality of terms associated with the previous contactless card;

format, by the application, the subset of the plurality of terms according to a modified format, wherein the modified format comprises one or more of a highlight effect, a bold effect, or an italics effect applied to the subset of the plurality of terms; and transmit, by the application, the formatted subset of the plurality of terms to the web browser.

14. The system of claim 13, the memory storing instructions which when executed by the processor, cause the processor to:

transmit, by the application to the web browser executing on the device, a link directed to the plurality of terms associated with the contactless card.

15. A method, comprising:

receiving, by an application executing on a processor of a server via a network, a request from a device specifying a uniform resource locator (URL) comprising encrypted data, the encrypted data based at least in part on a private key assigned to a contactless card, wherein the encrypted data is a parameter of the URL, wherein the URL is generated by the contactless card and read by the device;

decrypting, by the application, the encrypted data based on the private key;

determining, by the application, that the contactless card is a first type of contactless card, the first type of contactless card one of a plurality of types of contactless cards;

determining, by the application, a plurality of terms associated with the first type of contactless card;

transmitting, by the application, the determined plurality of terms to a web browser executing on the device;

receiving, by the application from the web browser, an indication specifying acceptance of the plurality of terms; and storing, by the application based on the decryption of the encrypted data and the received indication specifying acceptance of the plurality of terms, an indication in a database specifying the contactless card is activated for use.

16. The method of claim 15, further comprising:

determining the contactless card is of the first type of contactless card based on a unique identifier assigned to the contactless card; and transmitting an indication to the web browser executing on the device specifying that the contactless card is activated for use.

17. The method of claim 15, further comprising:

extracting, by the application, the encrypted data from the URL; and decoding, by the application, the extracted encrypted data prior to the decryption.

18. The method of claim 15, further comprising:

extracting, by the application, a counter value from the encrypted data;

encrypting, by the application, the counter value and the private key to generate a diversified key; and decrypting, by the application, the encrypted data using the diversified key.

19. The method of claim 15, further comprising:

receiving, by the application, a plurality of attributes from a user profile associated with the contactless card, the plurality of attributes comprising at least the first type of contactless card and an address associated with the contactless card; and determining, by the application, the plurality of terms based on the first type of contactless card and the address associated with the contactless card, wherein at least one term of the plurality of terms is based on the address.

20. The method of claim 15, further comprising:

determining, by the application based on a user profile associated with the contactless card, that the contactless card is a replacement of a previous contactless card specified in the user profile;

determining, by the application, a date of the previous contactless card;

determining, by the application, a previous plurality of terms associated with the previous contactless card;

determining, by the application based on the date of the previous contactless card and a date of the contactless card, a subset of the plurality of terms associated with the contactless card that have changed relative to the plurality of terms associated with the previous contactless card;

formatting, by the application, the subset of the plurality of terms according to a modified format, wherein the modified format comprises one or more of a highlight effect, a bold effect, or an italics effect applied to the subset of the plurality of terms; and transmitting, by the application, the formatted subset of the plurality of terms to the web browser.

* * * * *